US012280372B2

(12) United States Patent
Chiou et al.

(10) Patent No.: US 12,280,372 B2
(45) Date of Patent: Apr. 22, 2025

(54) ARBITRARILY SHAPED, DEEP SUB-WAVELENGTH ACOUSTIC MANIPULATION FOR MICROPARTICLE AND CELL PATTERNING

(71) Applicant: THE REGENTS OF THE UNIVERSITY OF CALIFORNIA, Oakland, CA (US)

(72) Inventors: Pei Yu E. Chiou, Oakland, CA (US); Kuan-Wen Tung, Oakland, CA (US); Benjamin M. Wu, San Marino, CA (US)

(73) Assignee: The Regents of the University of California, Oakland, CA (US)

( * ) Notice: Subject to any disclaimer, the term of this patent is extended or adjusted under 35 U.S.C. 154(b) by 743 days.

(21) Appl. No.: 17/605,925

(22) PCT Filed: Apr. 24, 2020

(86) PCT No.: PCT/US2020/029747

§ 371 (c)(1),
(2) Date: Oct. 22, 2021

(87) PCT Pub. No.: WO2020/219831

PCT Pub. Date: Oct. 29, 2020

(65) Prior Publication Data

US 2022/0203359 A1 Jun. 30, 2022

Related U.S. Application Data

(60) Provisional application No. 62/837,768, filed on Apr. 24, 2019.

(51) Int. Cl.
*B01L 3/00* (2006.01)
*B06B 3/00* (2006.01)

(52) U.S. Cl.
CPC ..... *B01L 3/50273* (2013.01); *B01L 3/502761* (2013.01); *B01L 2300/123* (2013.01);
(Continued)

(58) Field of Classification Search
None
See application file for complete search history.

(56) References Cited

U.S. PATENT DOCUMENTS 8,998,483 B2 * 4/2015 Friend ................ B01F 33/3021 366/341
2010/0331220 A1 12/2010 Jayasekera
(Continued)

OTHER PUBLICATIONS

Ashkin, A., Dziedzic, J. M. & Yamane, T. Optical trapping and manipulation of single cells using infrared laser beams. Nature 330, 769-771 (1987).

(Continued)

*Primary Examiner* — Neil N Turk
(74) *Attorney, Agent, or Firm* — Riverside Law LLP

(57) ABSTRACT

The present invention relates to a near-field acoustic platform capable of synthesizing high resolution, arbitrarily shaped energy potential wells. A thin and viscoelastic membrane is utilized to modulate acoustic wavefront on a deep, sub-wavelength scale by suppressing the structural vibration selectively on the platform. This new acoustic wavefront modulation mechanism is powerful for manufacturing complex biologic products.

20 Claims, 12 Drawing Sheets

(52) U.S. Cl.
CPC . *B01L 2300/161* (2013.01); *B01L 2300/1894* (2013.01); *B01L 2400/0439* (2013.01)

(56) References Cited

U.S. PATENT DOCUMENTS

| | | | | |
|---|---|---|---|---|
| 2013/0116459 | A1 | 5/2013 | Marrone | |
| 2013/0192958 | A1* | 8/2013 | Ding | B07C 5/3427 198/630 |
| 2014/0008307 | A1* | 1/2014 | Guldiken | B01L 3/502761 422/502 |
| 2016/0380404 | A1 | 12/2016 | Bulovic | |

OTHER PUBLICATIONS

Bazou, D., Coakley, W. T., Hayes, A. J. & Jackson, S. K. Long-term viability and proliferation of alginate-encapsulated 3-D HepG2 aggregates formed in an ultrasound trap. Toxicol. In Vitro 22, 1321-1331 (2008).
Bian, Y. et al. Acoustofluidic waveguides for localized control of acoustic wavefront in microfluidics. Microfluid. Nanofluidics 21, 132 (2017).
Boisvert, F.-M. et al. A quantitative spatial proteomics analysis of proteome turnover in human cells. Mol. Cell. Proteomics mcp. M111.011429 (2011). doi:10.1074/mcp.M111.011429.
Bruus, H. Acoustofluidics 2: Perturbation theory and ultrasound resonance modes. Lab. Chip 12, 20-28 (2011).
Bruus, H. Acoustofluidics 7: The acoustic radiation force on small particles. Lab. Chip 12, 1014-1021 (2012).
Castro, A. & Hoyos, M. Study of the onset of the acoustic streaming in parallel plate resonators with pulse ultrasound. Ultrasonics 66, 166-171 (2016).
Chen, Y. et al. Tunable Nanowire Patterning Using Standing Surface Acoustic Waves. (2013). doi:10.1021/nn4000034.
Cheng, I.-F., Chang, H.-C., Hou, D. & Chang, H.-C. An integrated dielectrophoretic chip for continuous bioparticle filtering, focusing, sorting, trapping, and detecting. Biomicrofluidics 1, 021503 (2007).
Chia, H. N. & Wu, B. M. Recent advances in 3D printing of biomaterials. J. Biol. Eng. 9, (2015).
Chiang, M.-Y., Hsu, Y.-W., Hsieh, H.-Y., Chen, S.-Y. & Fan, S.-K. Constructing 3D heterogeneous hydrogels from electrically manipulated prepolymer droplets and crosslinked microgels. Sci. Adv. 2, e1600964 (2016).
Collins, D. J. et al. Two-dimensional single-cell patterning with one cell per well driven by surface acoustic waves. Nat. Commun. 6, 8686 (2015).
Destgeer, G. & Jin Sung, H. Recent advances in microfluidic actuation and micro-object manipulation via surface acoustic waves. Lab. Chip 15, 2722-2738 (2015).
Ding, X. et al. On-chip manipulation of single microparticles, cells, and organisms using surface acoustic waves. Proc. Natl. Acad. Sci. 109, 11105-11109 (2012).
Ding, X. et al. Tunable patterning of microparticles and cells using standing surface acoustic waves. Lab. Chip 12, 2491-2497 (2012).
Evander, M. et al. Noninvasive Acoustic Cell Trapping in a Microfluidic Perfusion System for Online Bioassays. Anal. Chem. 79, 2984-2991 (2007).
Friend, J. & Yeo, L. Fabrication of microfluidic devices using polydimethylsiloxane. Biomicrofluidics 4, (2010).
Gervais, L., Rooij, N. de & Delamarche, E. Microfluidic Chips for Point-of-Care Immunodiagnostics. Adv. Mater. 23, H151-H176 (2011).
Guo, F. et al. Three-dimensional manipulation of single cells using surface acoustic waves. Proc. Natl. Acad. Sci. 113, 1522-1527 (2016).
Hammarström, B., Laurell, T. & Nilsson, J. Seed particle-enabled acoustic trapping of bacteria and nanoparticles in continuous flow systems. Lab. Chip 12, 4296-4304 (2012).
Hanoosh, W. S. & Abdelrazaq, E. M. Polydimethyl Siloxane Toughened Epoxy Resins: Tensile Strength and Dynamic Mechanical Analysis. Malaysian Polymer Journal, (2009).
Hartono, D. et al. On-chip measurements of cell compressibility via acoustic radiation. Lab. Chip 11, 4072-4080 (2011).
Ho, C.-T. et al. Liver-cell patterning Lab Chip: mimicking the morphology of liver lobule tissue. Lab. Chip 13, 3578-3587 (2013).
Hu, W., Fan, Q. & T. Ohta, A. An opto-thermocapillary cell micromanipulator. Lab. Chip 13, 2285-2291 (2013).
J. Collins, D., Neild, A., deMello, A., Liu, A.-Q. & Ai, Y. The Poisson distribution and beyond: methods for microfluidic droplet production and single cell encapsulation. Lab. Chip 15, 3439-3459 (2015).
Jamilpour, N., Nam, K.-H., Gregorio, C. C. & Wong, P. K. Probing Collective Mechanoadaptation in Cardiomyocyte Development by Plasma Lithography Patterned Elastomeric Substrates. ACS Biomater. Sci. Eng. (2018). doi:10.1021/acsbiomaterials.8b00815.
K. Tay, A., Dhar, M., Pushkarsky, I. & Carlo, D. D. Research highlights: manipulating cells inside and out. Lab. Chip 15, 2533-2537 (2015).
Kang, B. et al. High-resolution acoustophoretic 3D cell patterning to construct functional collateral cylindroids for ischemia therapy. Nat. Commun. 9, (2018).
Kang, L. Microfluidics for drug discovery and development: From target selection to product lifecycle management. Drug Discov. Today 13, 1-13 (2008).
Kovalenko, A., Fauquignon, M., Brunet, T. & Mondain-Monval, O. Tuning the sound speed in macroporous polymers with a hard or soft matrix. Soft Matter 13, 4526-4532 (2017).
Lee, J.-H., Lee, K.-J., Park, H.-G. & Kim, J.-H. Possibility of air-filled rubber membrane for reducing hull exciting pressure induced by propeller cavitation. Ocean Eng. 103, 160-170 (2015).
Leibacher, I., Hahn, P. & Dual, J. Acoustophoretic cell and particle trapping on microfluidic sharp edges. Microfluid. Nanofluidics 19, 923-933 (2015).
Leibacher, I., Reichert, P. & Dual, J. Microfluidic droplet handling by bulk acoustic wave (BAW) acoustophoresis. Lab. Chip 15, 2896-2905 (2015).
Leibacher, I., Schatzer, S. & Dual, J. Impedance matched channel walls in acoustofluidic systems. Lab. Chip 14, 463-470 (2014).
Lim, B. et al. Magnetophoretic circuits for digital control of single particles and cells. Nat. Commun. 5, 3846 (2014).
Muller, P. B., Barnkob, R., Jensen, M. J. H. & Bruus, H. A numerical study of microparticle acoustophoresis driven by acoustic radiation forces and streaming-induced drag forces. Lab. Chip 12, 4617 (2012).
Nama, N. et al. Numerical study of acoustophoretic motion of particles in a PDMS microchannel driven by surface acoustic waves. Lab. Chip 15, 2700-2709 (2015).
Nilsson, J., Evander, M., Hammarström, B. & Laurell, T. Review of cell and particle trapping in microfluidic systems. Anal. Chim. Acta 649, 141-157 (2009).
Palchesko, R. N., Zhang, L., Sun, Y. & Feinberg, A. W. Development of Polydimethylsiloxane Substrates with Tunable Elastic Modulus to Study Cell Mechanobiology in Muscle and Nerve. PLOS ONE 7, e51499 (2012).
Panwar, A. & Tan, L. P. Current Status of Bioinks for Micro-Extrusion-Based 3D Bioprinting. Molecules 21, (2016).
Puleo, C. M., Yeh, H.-C. & Wang, T.-H. Applications of MEMS Technologies in Tissue Engineering. Tissue Eng. 13, 2839-2854 (2007).
Raeymaekers, B., Pantea, C. & Sinha, D. N. Manipulation of diamond nanoparticles using bulk acoustic waves. J. Appl. Phys. 109, 014317 (2011).
Randall, G. C. & Doyle, P. S. Permeation-driven flow in poly(dimethylsiloxane) microfluidic devices. Proc. Natl. Acad. Sci. 102, 10813-10818 (2005).
Rezk, A. R., Tan, J. K. & Yeo, L. Y. HYbriD Resonant Acoustics (HYDRA). Adv. Mater. 28, 1970-1975 (2016).
Steven Lin, S.-C., Mao, X. & Jun Huang, T. Surface acoustic wave (SAW) acoustophoresis: now and beyond. Lab. Chip 12, 2766-2770 (2012).

(56) References Cited

OTHER PUBLICATIONS

Sun, J., Jamilpour, N., Wang, F.-Y. & Wong, P. K. Geometric control of capillary architecture via cell-matrix mechanical interactions. Biomaterials 35, 3273-3280 (2014).
Taller, D. et al. On-chip surface acoustic wave lysis and ion-exchange nanomembrane detection of exosomal RNA for pancreatic cancer study and diagnosis. Lab. Chip 15, 1656-1666 (2015).
Tsou, J. K., Liu, J., Barakat, A. I. & Insana, M. F. Role of Ultrasonic Shear Rate Estimation Errors in Assessing Inflammatory Response and Vascular Risk. Ultrasound Med. Biol. 34, 963-972 (2008).
Verneuil, E., Buguin, A. & Silberzan, P. Permeation-induced flows: Consequences for silicone-based microfluidics. EPL Europhys. Lett. 68, 412 (2004).
Wood, D. K., Weingeist, D. M., Bhatia, S. N. & Engelward, B. P. Single cell trapping and DNA damage analysis using microwell arrays. Proc. Natl. Acad. Sci. 107, 10008-10013 (2010).
Xiao, Y., Lu, Y., Hsieh, M., Liao, J. & Wong, P. K. A Microfiltration Device for Urogenital Schistosomiasis Diagnostics. PLOS ONE 11, e0154640 (2016).
Xu, W., Chahine, N. & Sulchek, T. Extreme Hardening of PDMS Thin Films Due to High Compressive Strain and Confined Thickness. Langmuir 27, 8470-8477 (2011).
Yeo, L. Y. & Friend, J. R. Ultrafast microfluidics using surface acoustic waves. Biomicrofluidics 3, 012002 (2009).
Zhang, H. & Liu, K.-K. Optical tweezers for single cells. J. R. Soc. Interface 5, 671-690 (2008).
Zhong, M.-C., Wei, X.-B., Zhou, J.-H., Wang, Z.-Q. & Li, Y.-M. Trapping red blood cells in living animals using optical tweezers. Nat. Commun. 4, 1768 (2013).

* cited by examiner

100

114
110
membrane
108
104
106
bulk
Air
112
Wave
PDMS
Glass
116

Absolute Pressure [a.u.]
1
0
Cell 104
102
Glass
PDMS
Air

ARBITRARILY SHAPED, DEEP SUB-WAVELENGTH ACOUSTIC MANIPULATION FOR MICROPARTICLE AND CELL PATTERNING

CROSS-REFERENCE TO RELATED APPLICATIONS

This application is a U.S. national phase application filed under 35 U.S.C. § 371 claiming benefit to International Patent Application No. PCT/US2020/029747, filed Apr. 24, 2020, which is entitled to priority under 35 U.S.C. § 119 (e) to U.S. Provisional Patent Application No. 62/837,768, filed Apr. 24, 2019, each of which applications is hereby incorporated herein by reference in its entirety.

STATEMENT REGARDING FEDERALLY SPONSORED RESEARCH OR DEVELOPMENT

This invention was made with government support under Grant No. 1711507 from the National Science Foundation. The government has certain rights in the invention.

BACKGROUND OF THE INVENTION

Methods for manipulating biological objects over the scales from micrometer to centimeter are the foundation to many biomedical applications, including the study of cell-cell interaction (Nilsson J et al., Analytica chimica acta, 649 (2), 141-157; Sun J et al., Biomaterials, 35 (10), 3273-3280), single-cell analysis (Wood D K et al., Proceedings of the National Academy of Sciences, 107 (22), 10008-10013; Collins D J et al., Lab on a Chip, 15 (17), 3439-3459), drug development (Kang L et al., Drug discovery today, 13 (1-2), 1-13), point-of-care diagnostics (Gervais L et al., Advanced materials, 23 (24), H151-H176; Taller D et al., Lab on a Chip, 15 (7), 1656-1666; Xiao Y et al., PloS one, 11 (4), e0154640), and tissue engineering (Puleo C M et al., Tissue engineering, 13 (12), 2839-2854; Jamilpour N et al., ACS Biomaterials Science & Engineering, 2019). Conventional methodologies deployed using optical (Hu W et al., Lab on a Chip, 13 (12), 2285-2291; Zhong M C et al., Nature communications, 4, 1768; Ashkin A et al., Nature, 330 (6150), 769; Zhang H et al., Journal of the Royal Society interface, 5 (24), 671-690), magnetic (Lim B et al., Nature communications, 5, 3846), and electrokinetic (Ho C T et al., Lab on a Chip, 13 (18), 3578-3587; Chiang M Y et al., Science advances, 2 (10), e1600964; Cheng I F et al., Biomicrofluidics, 1 (2), 021503) forces are versatile, but they pose various deficiencies. Optical force can provide precise three-dimensional (3D) control of the manipulated objects but suffers from low throughput. Magnetic force is widely applied but it requires extra labeling of magnetic particles that could interfere with cell functions and downstream analyses. Other approaches based on electrokinetics, such as dielectrophoresis and electroosmosis, are simple to implement but are challenged by buffer incompatibility and electrical interference that could damage the manipulated samples. 3D printing (Chia H N et al., Journal of biological engineering, 9 (1), 4; Panwar A et al., Molecules, 21 (6), 685) provides another mean to form complex patterning profiles but has not been able to achieve precision control of its printed objects, thus limiting the resolution. Acoustic force, on the other hand, offers a potential avenue for noninvasive, label-free, and biocompatible manipulation.

Acoustic manipulation has attracted a lot of interests in the past for its superior biocompatibility and for its strength to control objects of sizes spanning from submicrometer to a few millimeter. Particles of different density and compressibility from the surrounding medium experience net acoustic radiation forces (ARF), incurred from non-uniform acoustic field distribution, that migrate them to either low or high potential energy regions. For particle of size much smaller than the wavelength (D<<λ), the ARF can be approximated by the following expressions (Bruus H, Lab on a Chip, 12 (6), 1014-1021):

$$F^{rad} = -\nabla U^{rad} \quad \text{(Eq. 1)}$$

$$U^{rad} = \frac{4\pi}{3}a^3\left[f_1\frac{1}{2}\kappa_o < p^2 > -f_2\frac{3}{4}\rho_0 < v^2 >\right] \quad \text{(Eq. 2)}$$

$$f_1 = 1 - \frac{\kappa_p}{\kappa_0} \quad \text{(Eq. 3)}$$

$$f_2 = \frac{2\left(\frac{\rho_p}{\rho_0} - 1\right)}{2\frac{\rho_p}{\rho_0} + 1} \quad \text{(Eq. 4)}$$

where $F^{rad}$ is the ARF, $U^{rad}$ is the acoustic potential energy, a is the radius of particle, and p and v are the first-order acoustic pressure and velocity at the particle. The material compressibility κ and density ρ are subscripted by 'p' and 'o' for the particle and the surrounding medium, respectively. Two frequently used conventional acoustic mechanisms, bulk acoustic waves (BAWs) (Raeymaekers B et al., Journal of Applied Physics, 109 (1), 014317; Leibacher I et al., Lab on a Chip, 15 (13), 2896-2905; Hammarström B et al., Lab on a Chip, 12 (21), 4296-4304; Castro A et al., Ultrasonics, 66, 166-171) and surface acoustic waves (SAWs) have been applied to generate the non-uniform acoustic field (Collins D J et al., Nature communications, 6, 8686; Ding X et al., Proceedings of the National Academy of Sciences, 109 (28), 11105-11109; Guo F et al., Proceedings of the National Academy of Sciences, 113 (6), 1522-1527; Tay A K et al., Lab on a Chip, 15 (12), 2533-2537; Destgeer G et al., Lab on a Chip, 15 (13), 2722-2738; Lin S C S et al., Lab on a Chip, 12 (16), 2766-2770; Yeo L Y et al., Biomicrofluidics, 3 (1), 012002; Chen Y et al., ACS nano, 7 (4), 3306-3314; Ding X et al., Lab on a Chip, 12 (14), 2491-2497; Bian Y et al., Microfluidics and nanofluidics, 21 (8), 132; Rezk A R et al., Advanced Materials, 28 (10), 2088-2088; Kang B et al., Nature communications, 9 (1), 5402). In BAWs, acoustically hard structures, such as silicon or glass microfluidic chambers, are fabricated to form resonant cavities. Acoustic frequencies matching with certain acoustic modes of the cavities are chosen to excite standing waves in these structures that form the non-uniform field. However, such mechanism limits the particle patterning profile to be simple and periodic with a spatial resolution less than half of the wavelength (½λ). Although one can improve the resolution by increasing the acoustic frequencies, significant heating due to high energy attenuation can cause severe issues during manipulation of biological objects. In SAWs, standing waves can be generated by implementing pairs of interdigitated transducers (IDTs) fabricated on a piezoelectric substrate. Counter propagating SAWs leaking into the chambers can form the standing waves to create the non-uniform field. Through tuning the phases and frequencies of the electrical signals applied to IDTs, dynamic patterning can be achieved. Nevertheless, due to the nature of standing waves, SAWs face similar issue of limited patterning profiles that are typically symmetric.

Furthermore, rapid attenuation of SAWs due to the energy transfer into fluid makes large area patterning difficult; a typical SAWs device cannot operate in an area greater than 1 mm×1 mm (Collins D J et al., Nature communications, 6, 8686).

Therefore, there is a need in the art for an acoustic approach able to produce high resolution, arbitrarily shaped potential energy wells across a large area. The present invention meets this unmet need.

SUMMARY OF THE INVENTION

In one aspect, the present invention relates to a compliant membrane acoustic patterning device for manipulating particles, comprising: a piezoelectric layer; a patterned layer comprising a plurality of cavities disposed on top of the piezoelectric layer, wherein each of the cavities are covered by a membrane that is flush with a top surface of the patterned layer; a fluid layer disposed on top of the patterned layer; a plurality of particles immersed in the fluid; a cover layer disposed on top of the fluid layer; and an oscillating power source configured to actuate the piezoelectric layer at an oscillation frequency.

In one embodiment, the piezoelectric layer comprises a material selected from the group consisting of: lead zirconate titate (PZT), barium titanate, and bismuth sodium titanate. In one embodiment, the piezoelectric layer has a thickness between about out 100 μm and 1000 μm. In one embodiment, the patterned layer comprises a material selected from the group consisting of: plastics, polymers, rubbers, gels, silicones, and polydimethylsiloxane (PDMS). In one embodiment, the patterned layer has a thickness between about 10 μm and 50 μm. In one embodiment, the membrane has a thickness between about 1 μm and 5 μm. In one embodiment, the membrane further comprises a coating selected from the group consisting of: a water impermeable coating, a hydrophobic coating, a hydrophilic coating, or a functionalized coating. In one embodiment, the fluid layer comprises a material selected from the group consisting of: water, cell culture media, blood, serum, and buffer solution. In one embodiment, the particle is selected from the group consisting of beads, nanoparticles, microparticles, cells, bubbles, microorganisms, nucleic acids, and proteins. In one embodiment, the cavities comprise a gas, a fluid, or air.

In one embodiment, the device further comprises a controller electrically connected to the oscillating power source and configured to modulate the oscillation frequency. In one embodiment, the device further comprises a temperature regulator and a temperature sensor, wherein the temperature regulator is configured to maintain a temperature of the device.

In another aspect, the present invention relates to a method of manipulating particles in a fluid, comprising the steps of: providing a compliant membrane acoustic patterning (CMAP) platform comprising a piezoelectric layer and a patterned layer disposed on top of the piezoelectric layer, wherein the patterned layer comprises at least one air cavity, each air cavity covered with a membrane that is flush with a top surface of the patterned layer; positioning a plurality of particles and a fluid on top of the patterned layer; positioning a cover layer on top of the fluid layer; passing an electrical signal to the piezoelectric layer that is converted into mechanical vibrations that generate acoustic waves at an oscillation frequency traveling upwards through the patterned layer, the fluid layer, and the cover layer; and forming near-field acoustic potential wells above each of the at least one air cavity by a difference in acoustic wave propagation through the patterned layer and the at least one air cavity, such that the plurality of particles accumulate on and conform to the membrane of each of the at least one air cavity.

In one embodiment, the patterned layer, air cavities, and membranes are formed by molding from a master mold, by injection molding, by stamping, by etching, or by 3D printing. In one embodiment, the electrical signal is provided by an oscillating power source electrically connected to a controller. In one embodiment, the oscillation frequency is between 1 MHz and 5 MHz. In one embodiment, the oscillation frequency is about 3 MHz.

In one embodiment, the method further comprises a step of maintaining a temperature of the platform. In one embodiment, the fluid is selected from the group consisting of: water, cell culture media, blood, serum, and buffer solution. In one embodiment, the plurality of particle is selected from the group consisting of beads, nanoparticles, microparticles, cells, bubbles, microorganisms, nucleic acids, and proteins.

BRIEF DESCRIPTION OF THE DRAWINGS

The following detailed description of exemplary embodiments of the invention will be better understood when read in conjunction with the appended drawings. It should be understood, however, that the invention is not limited to the precise arrangements and instrumentalities of the embodiments shown in the drawings.

(FIG. 1A) The device assembly consists of a PZT substrate as the power source, a glass intermediate allowing reattachment of the above air-embedded PDMS structure, and the PDMS structure that selectively blocks incoming acoustic travelling waves using air cavities. (FIG. 1B) A representative schematic of the resulting acoustic radiation potential field distribution immediately above the PDMS structure is shown. (FIG. 1C) Cross-sectional view of the assembly shows the bulk and membrane regions of the PDMS structure, as well as a PDMS encapsulation that is designed to attenuate the wave propagation and prevent wave reflection back into the chamber.

(FIG. 3B) Such change in E' gives rise to the compliance of membrane to the above fluid such that upward displacement of fluid above the bulk drives the fluid towards the downward, deforming membrane, vice versa. The resulting acoustic potential landscapes, immediately above the PDMS structure, for 10 μm polystyrene beads (FIG. 3C) and 10 μm porous PDMS beads (FIG. 3D) in water are simulated. For the polystyrene beads, high E' creates multiple potential wells across both the bulk and membrane regions while low E' creates potential wells conforming to the membrane area; notice that all the minimum potential wells are generated at the membrane edges. On the contrary, porous PDMS beads with high compressibility revert the potential profiles and result in overall smoother potential landscapes.

(FIG. 4A) of the radiation potential Eq. 2 shows same trend across the entire range of E' examined such that the pressure decreases from the maximum outside the membrane region to the minimum at the center. On the other hand, the velocity term $$-\frac{3}{4}\rho_0 < v^2 >$$

(FIG. 4B) of Eq. 2 shows variations across the range of E', except at the edges of membrane region where largest amplitude occur. The higher the E' is the stronger the fluctuation of the velocity term becomes. In all cases, largest velocity amplitude occurs at the membrane edges. Of note is that the relative contributions of these terms on the radiation potential profile needs to consider the $f_1$ and $f_2$ factors that represent particle's properties but not included here.

(FIG. 9A) Similar to the polystyrene beads in FIG. 8A, HeLa cells can be patterned into arbitrary shapes using soft PDMS. Due to heat generation of PZT, however, CMAP device platform is operated on a T.E. cooler to maintain the chamber temperature; the temperature as a function of time (FIG. 9B) is measured and the result shows a steady state at approximate 22° C. (FIG. 9C) After 5 min. of continuous operation in the device at the applied frequency of 3 MHz and voltage of 5 Vrms, cells show comparable viability at 96.73% to that of control at 94.52%. (FIG. 9D) Additionally, cells from both the control and experiment proliferated by more than three-folds over a two days period (48 hours), demonstrating the biocompatibility of the CMAP platform. Scale bar, 70 μm. (***Number of trials measured, n=3).

DETAILED DESCRIPTION

Figures 1A, 1B, 1C:
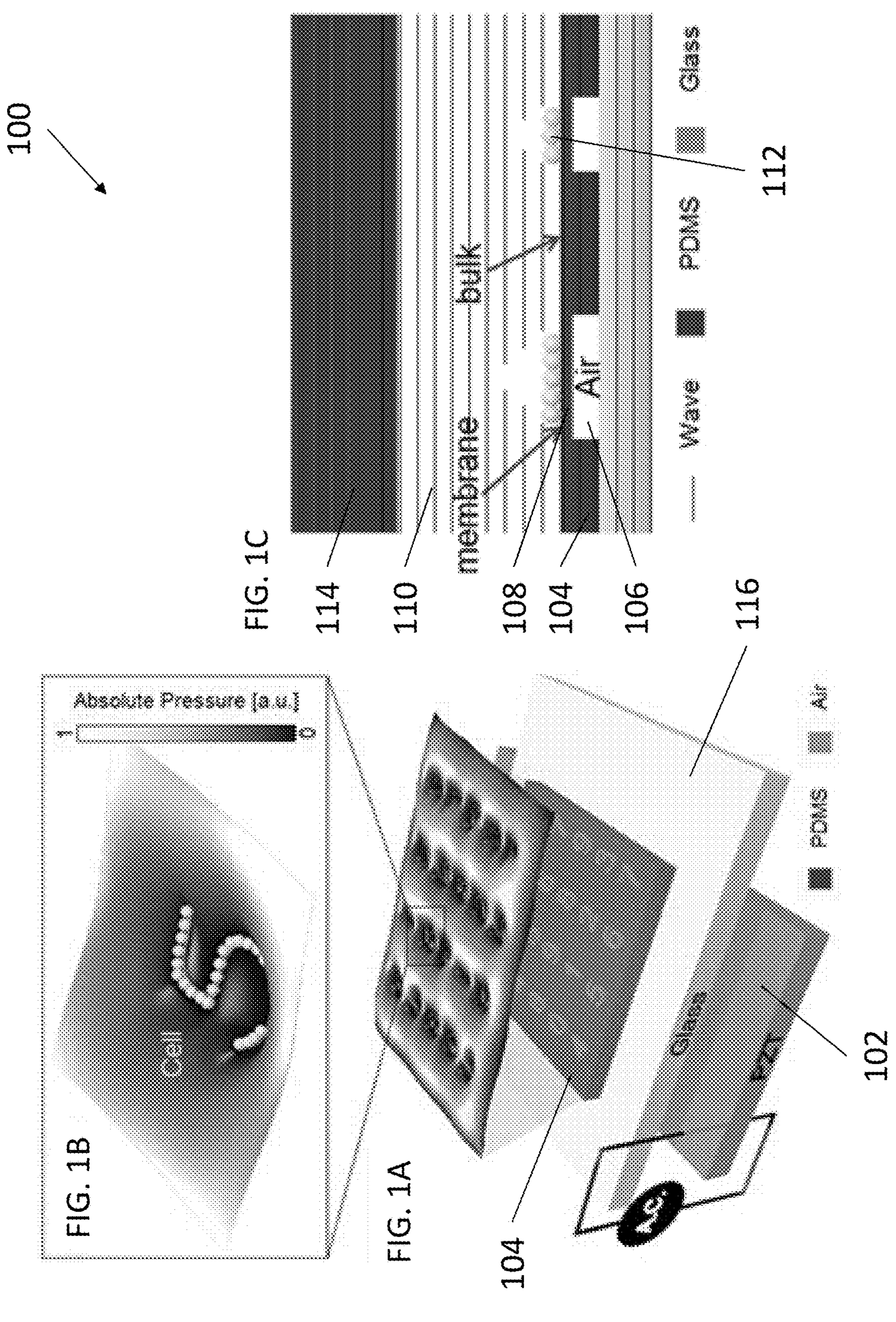
FIG. 1A through FIG. 1D depict an exemplary Compliant Membrane Acoustic Patterning (CMAP) device platform that enables arbitrarily shaped, deep subwavelength particle patterning.
Figure 1D:
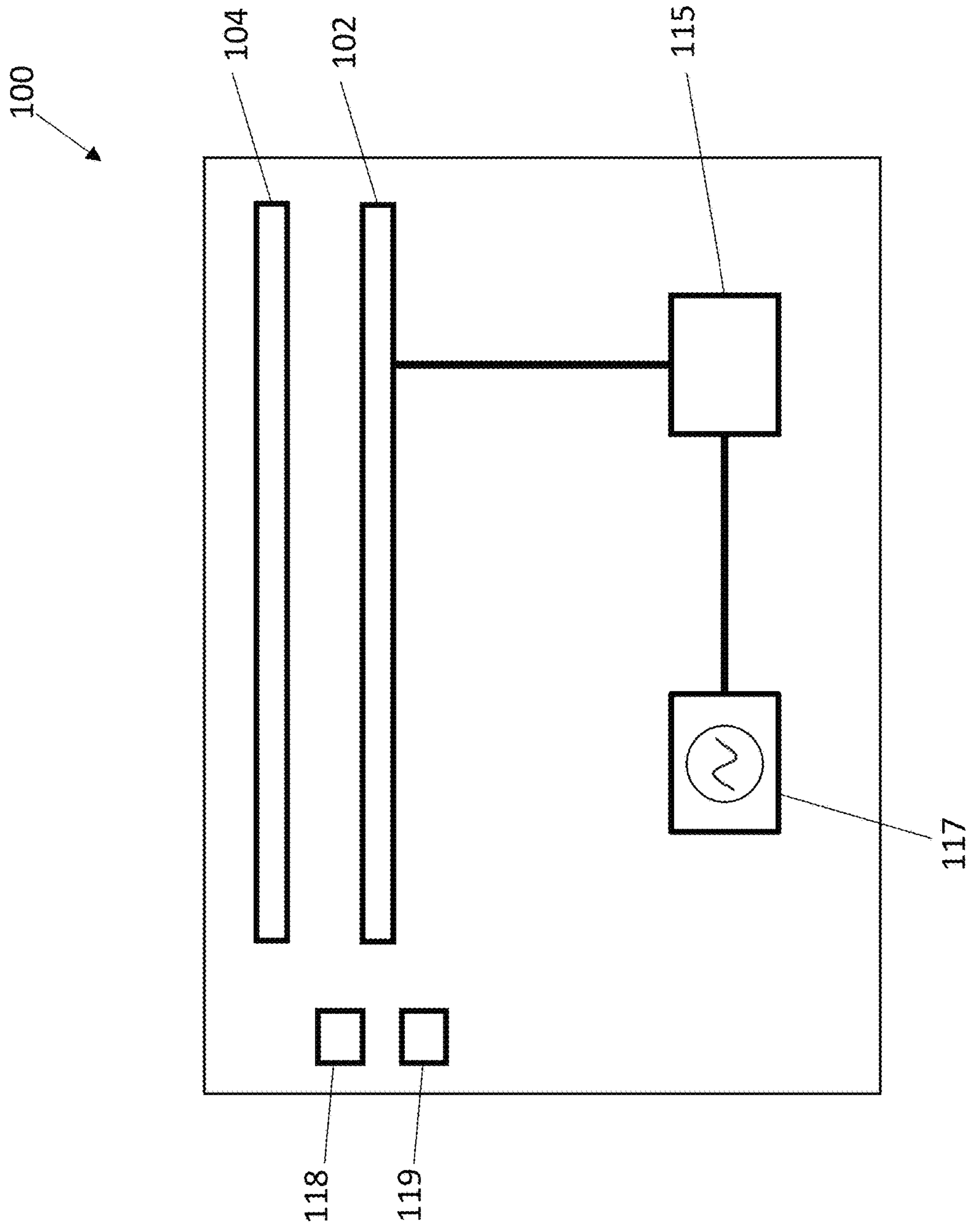

The present invention relates to a near-field acoustic platform capable of synthesizing high resolution, arbitrarily shaped energy potential wells. A thin and viscoelastic membrane is utilized to modulate acoustic wavefront on a deep, sub-wavelength scale by suppressing the structural vibration selectively on the platform. This new acoustic wavefront modulation mechanism is powerful for manufacturing complex biologic products.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Compliant Membrane Acoustic Patterning (CMAP) Platform

Complex patterning of micro-objects in liquid is crucial to many biomedical applications. Among conventional mythologies, acoustic approaches provide superior biocompatibility but are intrinsically limited to producing periodic patterns at low resolution due to the nature of standing wave and the coupling between fluid and structure vibrations. The present invention provides a compliant membrane acoustic patterning (CMAP) platform capable of synthesizing high resolution, arbitrarily shaped energy potential wells. A thin and viscoelastic membrane is utilized to modulate acoustic wavefront on a deep, sub-wavelength scale by suppressing the structural vibration selectively on the platform. Using acoustic excitation, arbitrary patternings of microparticles and cells with a line resolution of one tenth of the wavelength of the acoustic excitation is achievable. Massively parallel patterning in areas as small as 3×3 $mm^2$ is also possible. This new acoustic wavefront modulation mechanism is powerful for manufacturing complex biologic products.

Referring now to FIG. 1A through FIG. 1D, an exemplary CMAP platform 100 is depicted. Platform 100 comprises a planar piezoelectric layer 102, a patterned layer 104, a fluid layer 110, and a cover layer 114. Piezoelectric layer 102 is a planar layer electrically connected to an oscillating power source 117, such as a power amplifier, controlled by a controller 115, such as a function generator, that feeds alternating current signals to piezoelectric layer 102. Piezoelectric layer 102 transforms the voltages into mechanical vibrations that generate acoustic waves at an oscillation frequency that travel through each layer of platform 100. Piezoelectric layer 102 can be constructed from any suitable piezoelectric material, including but not limited to lead zirconate titate (PZT), barium titanate, bismuth sodium titanate, and the like. Piezoelectric layer 102 can have any suitable thickness. For example, piezoelectric layer 102 can have a thickness between about 100 μm and 1000 μm.

Patterned layer 104 is a planar layer that is disposed on top of piezoelectric layer 102. Visible in FIG. 1A and FIG. 1C, patterned layer 104 comprises a plurality of cavities 106, each cavity 106 being formed in the shape of a desired pattern. For example, as depicted in FIG. 1A, patterned layer 104 comprises a plurality of cavities 106 each formed in a numeric shape, wherein the numeric shape is apparent from a top-down view. Each cavity 106 is covered by a membrane 108 that is flush with a top surface of patterned layer 104, such that a volume of a gas, a fluid, or air is contained within each cavity 106. Patterned layer 104 and membrane 108 can each be constructed from any suitable material, including but not limited to plastics, polymers, rubbers, gels, silicones, polydimethylsiloxane (PDMS), and the like. Patterned layer 104 and membrane 108 can each have any suitable thickness. For example, patterned layer 104 can have a thickness between about 10 μm and 50 μm, and membrane 108 can have a thickness between about 1 μm and 5 μm. In some embodiments, membrane 108 can further comprise a coating. The coating can include, but is not limited to, a water impermeable coating, a hydrophobic coating, a hydrophilic coating, or a functionalized coating.

Fluid layer 110 is disposed on top of patterned layer 104 and membrane 108. Fluid layer 110 can comprise any suitable fluid, including but not limited to water, cell culture media, blood, serum, buffer solution, and the like. Fluid layer 110 can have any suitable height or depth, such as a height or depth between about 0.5 cm and 5 cm. Fluid layer 110 comprises a plurality of particles 112 that are desired to be patterned into shapes formed by cavities 106 in patterned layer 104. Particles 112 can comprise any desired particle, including but not limited to beads, nanoparticles, microparticles, cells, bubbles, microorganisms, nucleic acids, proteins, and the like.

Cover layer 114 is a planar layer that is disposed on top of fluid layer 110. Cover layer 114 attenuates acoustic waves to minimize wave reflection and serves to enclose fluid layer 110. Cover layer 114 can be constructed from any suitable material, including but not limited to plastics, polymers, rubbers, gels, silicones, PDMS, and the like. Cover layer 114 can have any suitable thickness. For example, cover layer 114 can have a thickness between about 0.5 cm and 5 cm.

In certain embodiments, patterned layer 104, membrane 108, and cover layer 114 are each constructed from the same material. In some embodiments, patterned layer 104, membrane 108, and cover layer 114 are each constructed from a material having an acoustic impedance substantially similar to an acoustic impedance of fluid layer 110. In some embodiments, the acoustic impedance of each of patterned layer 104, membrane 108, fluid layer 110, and cover layer 114 are within 25%, 20%, 15%, 10%, 5%, or 1% of each other.

While not pictured, it should be understood that platform 100 comprises a housing sized to fit each of the piezoelectric layer 102, patterned layer 104, fluid layer 110, and cover layer 114. The housing comprises sidewalls such that a fluid is containable within the housing to form fluid layer 110. In some embodiments, the housing comprises an internal horizontal surface area and shape matched to a horizontal surface area and shape of patterned layer 104 and cover layer 114, such that each of the patterned layer 104, and cover layer 114 sits flush within the interior of the housing. In some embodiments, platform 100 further comprises an intermediate layer 116 disposed between piezoelectric layer 102 and patterned layer 104. Intermediate layer 116 can be provided as a physical barrier between piezoelectric layer 102 and patterned layer 104 for ease of use and cleaning, such that one or more patterned layers 104 can be replaced without fouling piezoelectric layer 102. In some embodiments, a bottom surface of the housing forms intermediate layer 116. Intermediate layer 116 can be constructed from any suitable material, including but not limited to a glass, a metal, a plastic, a ceramic, and the like. Intermediate layer 116 can have any suitable thickness. For example, intermediate layer 116 can have a thickness between about 100 μm and 1000 μm.

Platform 100 is amenable to any desired modification. For example, in some embodiments platform 100 further comprises a temperature regulator 119 and sensor 118, such as a thermoelectric cooler and a thermocouple, respectively. The temperature regulator 119 can be provided to maintain the temperature of platform 100 (such as patterned layer 104 and fluid layer 110) for certain applications, and the temperature sensor 118 can be provided to monitor the temperature of platform 100.

Method of Acoustic Manipulation Patterning

Figure 2:
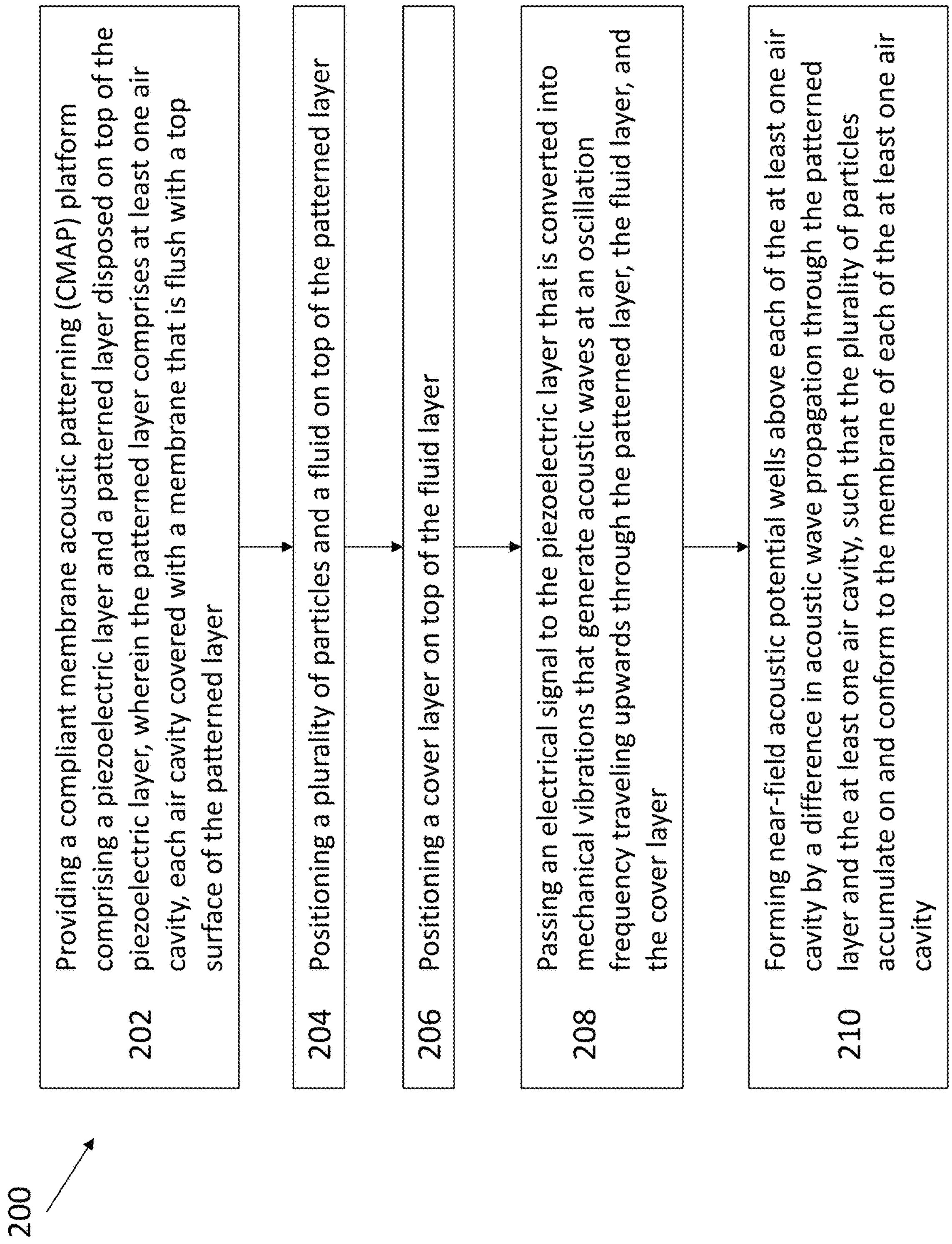
FIG. 2 depicts a flowchart of an exemplary method of synthesizing patternings of particles.

The present invention also provides methods of using the CMAP platform described herein to synthesize patternings of particles. Referring now to FIG. 2, an exemplary method 200 is depicted. Method 200 begins with step 202, wherein a compliant membrane acoustic patterning (CMAP) platform is provided, the platform comprising a piezoelectric layer and a patterned layer disposed on top of the piezoelectric layer, wherein the patterned layer comprises at least one air cavity, each air cavity covered with a membrane that is flush with a top surface of the patterned layer. In step 204, a plurality of particles and a fluid are positioned on top of the patterned layer, forming a fluid layer. In step 206, a cover layer is positioned on top of the fluid layer. In step 208, an electrical signal is passed to the piezoelectric layer and converted into mechanical vibrations that generate acoustic waves at an oscillation frequency traveling upwards through the patterned layer, the fluid layer, and the cover layer. In step 210, a difference in acoustic wave propagation through the patterned layer and the at least one air cavity forms near-field acoustic potential wells above each of the at least one air cavity, such that the plurality of particles accumulate on and conform to the membrane of each of the at least one air cavity.

The patterned layer can be formed using any method commonly used in the art. In various embodiments, the patterned layer with cavities and membranes can be constructed using molding (such as with a master mold), injection molding, stamping, etching, 3D printing or other forms of additive manufacturing, and the like.

The electrical signal can be provided by an oscillating power source 117, such as a power amplifier, connected to a controller 115, such as a function generator. The electrical signal can be described in terms of oscillation frequency. For example, the oscillation frequency can be between about 1 MHz and 5 MHz. In some embodiments, the oscillation frequency is about 3 MHz. In some embodiments, the method further comprises a step of maintaining a temperature of the platform. The temperature can be maintained using a temperature regulator 119 and monitored using a temperature sensor 118.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out exemplary embodiments of the present invention, and are not to be construed as limiting in any way the remainder of the disclosure.

Example 1: Arbitrarily Shaped, Deep Sub-Wavelength Acoustic Manipulation for Microparticle and Cell Patterning Methods that enable complex patterning of micro-objects are crucial to many biomedical applications. In recent years, acoustic manipulation has emerged as a promising approach to pattern biological samples for its superior biocompatibility. Current acoustic techniques, however, encounter a major technical barrier in forming complex patterns, and thus are limited to producing simple and periodic assembly of objects. In contrary to other physical methods, arbitrarily shaped patterns cannot be achieved using current techniques based on either surface acoustic waves (SAWs) or bulk acoustic waves (BAWs). Such barriers originate from their standing wave nature that is the underlying mechanism and the coupled fluid-structure vibrations within.

The present study demonstrates a new acoustic manipulation principle that overcomes the technical barriers of current techniques and provides, for the first time, the capability to form high-resolution, arbitrarily shaped complex patterns not feasible by existing acoustic techniques. The principle, named Compliant Membrane Acoustic Patterning (CMAP), utilizes acoustic traveling waves and air cavities embedded in an elastomer to generate near-field potential landscape for patterning. The compliant membrane formed around the cavities and the viscoelastic nature of the elastomer, combined, effectively suppress any structure vibration and eliminate high order mode patterns. As a result, arbitrarily shaped acoustic potential landscape can be realized on the surface of CMAP to create complex patterns that are nearly identical to the shape of the cavities.

The potential of CMAP in the field of acoustic manipulation, as well as in the realm of tissue engineering, is immense. CMAP is the most capable acoustic technique that enables manipulation of microscale objects, including biological cells, to form high-resolution, arbitrarily shaped complex assemblies. Furthermore, the simplicity in designing and fabricating the CMAP platform allows researchers in relevant fields to easily adapt this tool for broad impacts.

The methods and materials are now described.

Device Design and Assembly

The CMAP device, FIG. 1A through FIG. 1D, consists of a PZT substrate (lead zirconate titanate), soda-lime glass, and top and bottom PDMS structures. The PZT of dimension 3 cm×1 cm×0.05 cm (L×W×H) from APC International Ltd. and of material type 841 generates acoustic travelling waves across the device. On the top, a soda-lime glass slide from Corning (Model 2947-75x50) dimensioned 2 cm×2 cm×0.1 cm (L×W×H) is affixed using epoxy. Glass allows easy reattachment of the soft, air-embedded PDMS structure which renders the PZT substrate to be reusable. The soft PDMS structure is fabricated, in a similar fashion as the standard PDMS replica molding (Friend J et al., Biomicrofluidics, 4 (2), 026502), using a mixture of Sylgard 527 and 184 in a weight-to-weight ratio of 4 to 1. The master mold is composed of MicroChem Corp's SU-8 3025 micro-structures photolithography-patterned on a Silicon wafer which shapes the embedded air cavities. The molding process is carried out by covering the master mold in the Sylgard mixture and then stamping using another slide of glass topped with aluminum block (~7,500 g). As results, ~2 μm thick of meniscus is formed on the micro-structures and it becomes the PDMS membrane (See SEM image in FIG. 6B). For the soft PDMS structure, curing of the mixture is performed at room temperature. For the hard PDMS structure also demonstrated in the experiments, molding process differs by using pure Sylgard 184 cured in an oven at 70° C. for 4 hours. Subsequently, the soft/hard PDMS structure is transferred onto the device's glass layer. Microparticles or biological objects are then pipetted onto the structure and encapsulated with a thick PDMS. To minimize wave reflection inside the device's chamber, PDMS of Sylgard 184 is used as the encapsulation for its close acoustic impedance to that of water. In addition, the thickness of the encapsulation is designed to be 1 cm, which enables sufficient wave energy attenuation at our operating frequency of 3 MHz to prevent reflection from the interface between ambient air and device (Tsou J K et al., Ultrasound in medicine & biology, 34 (6), 963-972; Nama N et al., Lab on a Chip, 15 (12), 2700-2709).

Setup and Operation

The complete setup to using CMAP device involves a power amplifier (ENI Model 2100L), a function generator (Agilent Model 33220A), a T.E. cooler (T.E. Technology Model CP-031HT), an ultra-long working distance microscope lens (20× Mitutoyo Plan Apo), an upright microscope (Zeiss Model Axioskop 2 FS), and a mounted recording camera (Zeiss Model AxioCam mRm). Surfaces of the PZT substrate are wire-bonded and electrically connected to the power amplifier that is controlled by the function generator to feed the A.C. signals. Upon receiving the signals, the PZT transforms the sinusoidal voltages into mechanical vibrations to generate the acoustic traveling waves across the device. To prevent cell damage from excessive PZT heating, the device was operated on a T.E. cooler set at 12° C. To monitor the temperature of the device's chamber, a thermocouple (Omega OM-74) was inserted through the PDMS encapsulation and the experiment was reran with only water in the chamber; results show stabilization below the incubation temperature of 37° C., suggesting suitability for long-term operation. The entire assembly is positioned under the Mitutoyo microscope lens mounted on the Zeiss Axioskop. Patterning process is then observed through the PDMS encapsulation that allows clear visualization and is recorded using the accompanied Zeiss AxioCam.

Acoustic-Structure Interaction Simulation

Figure 3B:
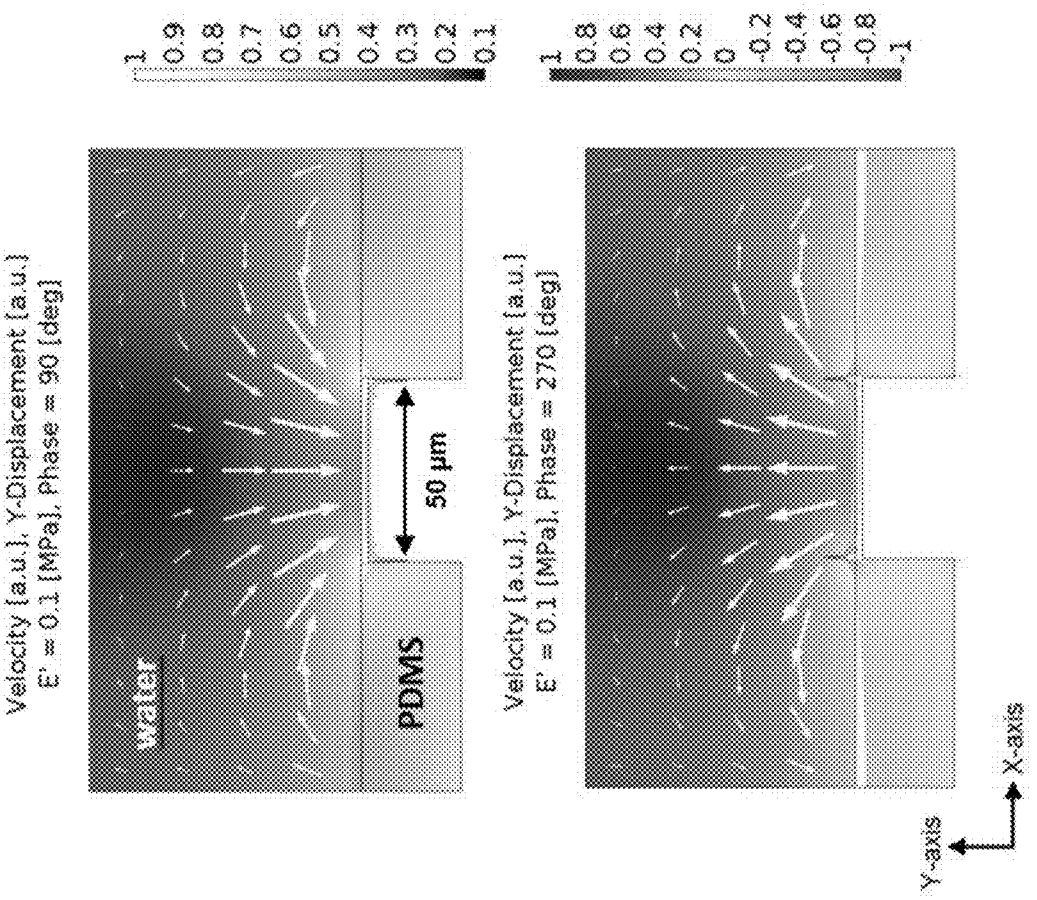
FIG. 3A through FIG. 3D depict the results of acoustic-structure interaction simulations investigating the effect of changing material properties of PDMS. During vibration, the surface of an air-embedded PDMS structure interfacing the chamber fluid shows smoother profile (FIG. 3A) and lower order structure vibration mode when the E' of the structure decreases from 100 MPa to 0.1 MPa. This is especially noticeable at the membrane region.

Acoustic-structure module, using finite element (F.E.) solver COMSOL Multiphysics 5.3, is implemented to study the acoustic potential landscape as the result of the soft/hard, air-embedded PDMS structure interacting with the chamber fluid upon excitation. FIG. 3B provides the 2-D model geometry consisting of a top fluid and bottom solid for which water and PDMS were simulated, respectively; the center of solid is an empty space representing air cavity. The bottom boundaries of the solid are excited using a prescribed displacement in y-direction, simulating the mode of vibration of the PZT along its thickness. An arbitrary isotropic loss factor (0.2) is factored into the simulation to account for the structural damping of the solid as in the case of PDMS. The resulting total acoustic pressure in the fluid is calculated by the F.E. solver, which solves the acoustic-structure interaction at the interface between the fluid and solid, as well as the inviscid momentum conservation equation (Euler's equation) and mass conservation equation (continuity equation) in the fluid. The simulation assumes classical pressure acoustics with isentropic thermodynamic processes and assumes time-harmonic wave. For a harmonic acoustic field, $$v_{in} = \frac{1}{i\omega\rho_0}\nabla p_{in},$$

where ω is the angular frequency in rad/s. The simulation not only allows post-processing of the acoustic potential landscape generated (FIG. 3C, FIG. 3D, FIG. 4A, and FIG. 4B) using Eq. 2, but also enables studies of $1^{st}$ order velocity of the chamber fluid (FIG. 3A) and surface profile of the solid (FIG. 3B, FIG. 5A through FIG. 5D) as function of E' and membrane size, respectively.

Acoustic Pressure Simulation

Acoustic pressure module, using finite element (F.E.) solver COMSOL Multiphysics 5.3, is implemented to simulate the pressure profile inside the device chamber. While the 3-D model geometry in FIG. 8C mimics the 2-D model in FIG. 3A, the bottom solid is treated as fluid rather than solid mechanics. This substitution eliminates the physics complication, as well as extra computing power, involved in the acoustic-structure interaction by considering only the materials' impedance (given by speed of sound and density) to simulate the wave propagation. For the soft PDMS structure, arbitrary values of speed of sound and density are used. Normal displacement in the direction of y-axis is specified on the bottom of solid, simulating the direction of PZT excitation. Plane wave radiation is assumed all around the boundaries of the top fluid, enabling outgoing plane wave to leave the modeling domain with minimal reflections.

Thickness Measurement of the PDMS Membrane

The fabricated PDMS structures are cut to reveal the cross section of membranes, and 3 membranes are examined using SEM. The measured thicknesses are 1.09 μm, 1.14 μm, and 1.33 μm, and their average thickness is approximately 2.18 μm. For simplicity, a 2 μm membrane thickness are assumed in the simulations.

Polystyrene Beads

Both 1 μm and 10 μm fluorescent green polystyrene beads are obtained from Thermo Fisher Scientific, USA.

Microporous PDMS Beads Fabrication

Uncured PDMS using Sylgard 184 (Dow Corning Co.) with curing agent at 10:1 was mixed with the solution of dodecyl sulfate sodium salt in DI water at 1:100 mass ratio. Using a vortex mixer, mixture of the PDMS solution in water generated PDMS spherical droplets of varying sizes. Subsequently, that mixture was cured inside an oven at 70° C. for 2 hours. The solidified microporous PDMS beads were then filtered using a sterile cell strainer of 40 μm nylon mesh (Fisher Scientific).

HeLa Cell Culturing

HeLa cells (American Type Culture Collection, ATCC) were maintained in Dulbecco's modified essential medium (DMEM, Corning) supplemented with 10% (vol/vol) fetal bovine serum (FBS, Thermo Scientific), 1% penicillin/streptomycin (Mediatech), and 1% sodium pyruvate (Corning). HeLa cells were kept in an incubator at 37° C. and 5% $CO_2$.

The results are now described.

Operating Principle of CMAP

Compliant Membrane Acoustic Patterning (CMAP) is a device platform that allows the creation of deep sub-wavelength resolution, arbitrarily shaped acoustic potential wells near an engineered membrane. Such a potential landscape is realized by exciting acoustic traveling waves, generated using a piezoelectric ceramic PZT (lead zirconate titanate), to pass through desired shapes of air cavities sized much smaller than the wavelength and embedded in a soft, viscoelastic Polydimethylsiloxane (PDMS) structure, as illustrated in FIG. 1A through FIG. 1D. PDMS is chosen since its acoustic impedance is close to that of surrounding fluid (water) for which the wave reflection at the PDMS/water interface can be minimized (Leibacher I et al., Lab on a Chip, 14 (3), 463-470). Air cavities are utilized since they have large acoustic impedance difference to most materials for which majority of the waves can be reflected (Lee J H et al., Ocean Engineering, 103, 160-170). As results, near-field acoustic potential wells are formed immediately above the air cavities with a spatial resolution matching to the cavities' size. A thick PDMS layer atop the water layer serves as a wave-absorbing medium to prevent acoustic waves from reflecting back.

One major challenge encountered in conventional acoustic patternings is the coupled fluid and structure vibration that complicates the design of device structure. With the CMAP platform, the effect of structure-induced vibration was minimized, otherwise it would interfere with the intended acoustic field and, ultimately, the shape of particle patterning was able to be predicted by using a simple pressure wave propagation model. This innovation can be carried out by incorporating a thin and compliant, viscoelastic PDMS membrane to interface the air cavities and the above chamber fluid. When the pressure waves propagate through the air-embedded PDMS structure, the vibration in the bulk decays within a short distance into the membrane due to two primary characteristics. One characteristic is the membrane's thinness and compliance for which it does not have sufficient stiffness to drive and move the fluid mass atop at high frequency. The second characteristic stems from material damping of the structure at high frequency that prevents the vibration energy from building up in the membrane region. Thus, the fluid pressure above the membrane region does not fluctuate much with the waves that propagate through the bulk into the fluid and remains at a relatively constant level compared to regions in the bulk. This creates a low acoustic pressure zone above the membrane and establishes a pressure gradient between the bulk and membrane regions. Since this near-field pressure zone depends on the membrane area attained from the air cavities that can be fabricated into any size and geometry, arbitrarily shaped particle patterning with a spatial resolution much smaller than the wavelength can be realized. Additionally, large area patterning can be achieved using the same actuation principle; for the fact that PZT substrate generates plane acoustic waves with uniform intensity, the maximum operating area is only limited by the PZT's available size. In short, since the acoustic potential landscape of CMAP does not rely on the formation of standing waves and since the disturbance to the landscape due to the structure-induced vibration may be minimized, the shape of potential wells simply reflects that of the air cavities.

Figure 3A:
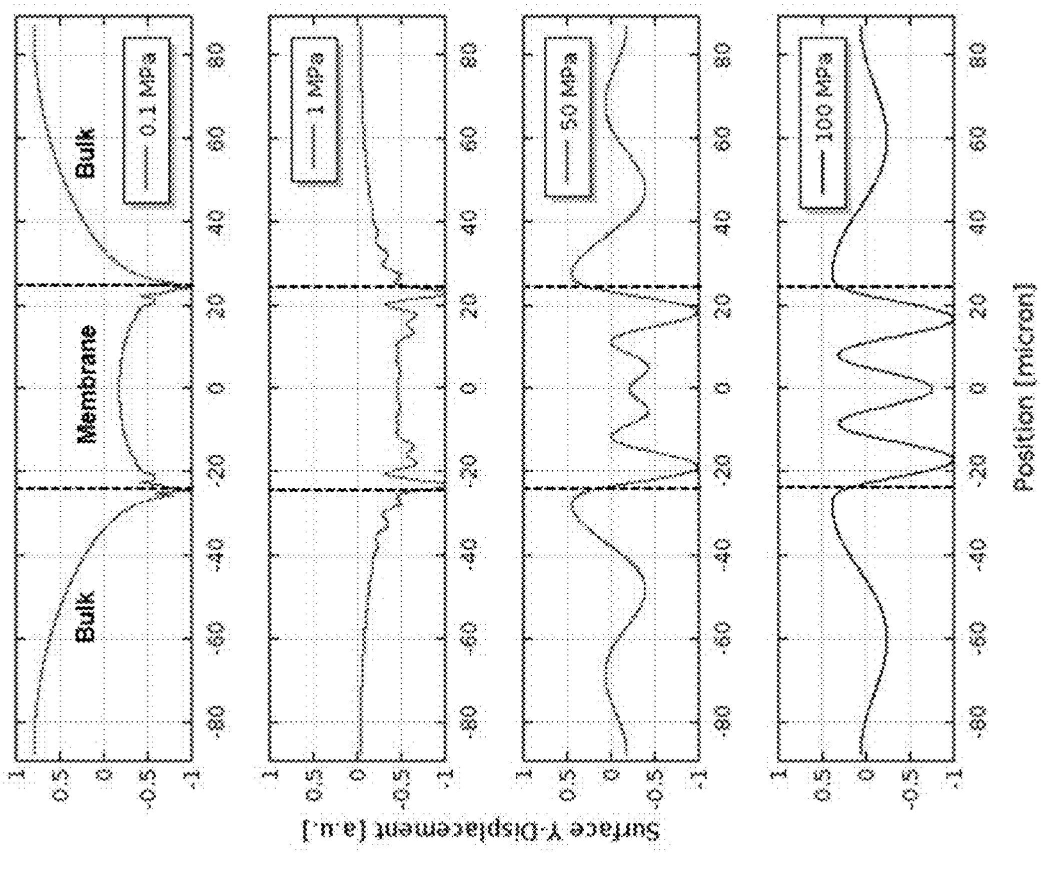

To quantitatively understand the operation principle of CMAP, the relationship between the material properties of PDMS and their effects on structure-induced vibration was studied using numerical simulation. COMSOL acoustic-structure interaction model is implemented, as shown in FIG. 3A through FIG. 3D. The model geometry considers a 50 μm wide air cavity embedded in a PDMS structure that leaves a 2 μm suspended membrane interfacing an above incompressible fluid (water). The relationship $\eta_s$=E"/E', where E' is the dynamic storage modulus, E" is the dynamic loss modulus, and $\eta_s$ is the isotropic loss factor of the PDMS structure accounting for the structural damping, is explored under the sinusoidal excitation frequency at 3 MHz. For simplicity, $\eta_s$ is assumed to be constant (0.2) while the moduli are varied. FIG. 3A examines the vertical displacement of the PDMS surface interfacing the fluid. Strong membrane vibration is observed for the structure of high E' at 100 MPa. This opposes to the case of low E' at 0.1 MPa in which the structure-induced vibration from the bulk decays substantially in a short distance at the membrane edge, leaving the membrane to be relatively flat and smooth. The softness and lightness of the membrane enable it to follow the motion of water when cycling through different phases of the excitation (FIG. 3B). Under an ideal operation condition, as acoustic waves travel through the patterned PDMS structure, the surface oscillation motions of the membrane and the bulk should be in the opposite direction, or out of phase. When the water above the bulk is being displaced upwards at phase 90 deg., the developed pressure drives the water towards the downward, deforming membrane to satisfy mass conservation ($\nabla \cdot V=0$) since it occurs on a length scale much shorter than the acoustic wavelength ($d \ll \lambda$). When the water above the bulk moves downwards at phase 270 deg., the water atop the membrane flows back to the bulk region. These back-and-forth fluid motions are repeated under the sinusoidal excitation.

Acoustic radiation potential landscape is estimated by accounting the resulting water pressure and velocity fields near the PDMS-fluid interface into Eq. 2. For 10 μm polystyrene beads ($\rho_p$=1050 kg m$^{-3}$, $\kappa_p$=2.4×10$^{-10}$ Pa$^{-1}$) (Muller P B et al., Lab on a Chip, 12 (22), 4617-4627), the potential profile at 5 μm above the air-embedded PDMS structure of E' at 100 MPa, FIG. 3C, reveals strong variation that leads to multiple metastable wells across both the membrane and bulk. On the other hand, the potential profile for the structure of E' at 0.1 MPa shows much smoother landscape with wells generated only at the membrane region, enabling beads' patterning shape that conforms to that of the air cavity. Minimum potential wells occurred at the membrane edges rather than at the center because the perturbed pressure term in Eq. 2 is weak and the velocity term dominates at these regions. The relative contributions of the pressure and velocity terms in the potential profile can be better explained by the energy density plots, $$\frac{1}{2}\kappa_o < p^2 > \text{and } \frac{3}{4}\rho_0 < v^2 >$$

Figure 3C:
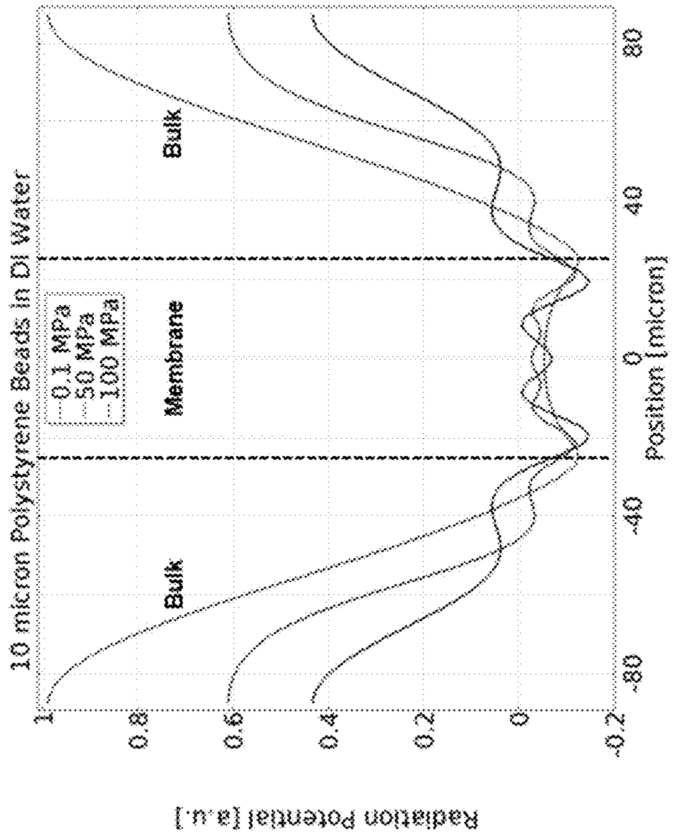

(shown in FIG. 4A and FIG. 4B), and their multiplication with the particle property factors ($f_1$=0.454 and $f_2$=0.024 for polystyrene beads in water). The large $f_1$ factor, compared to $f_2$, allows the pressure term to dominate in most regions except at the membrane. The fluctuation of the potential profiles at the membrane region in FIG. 3C is primarily attributed to the velocity term. Nevertheless, from the potential profile simulated for the case of structure of E' at 0.1 MPa, it can be predicted that the beads will begin accumulating at the membrane edges then eventually moving toward the center as more beads fill in from the bulk.

Figure 3D:
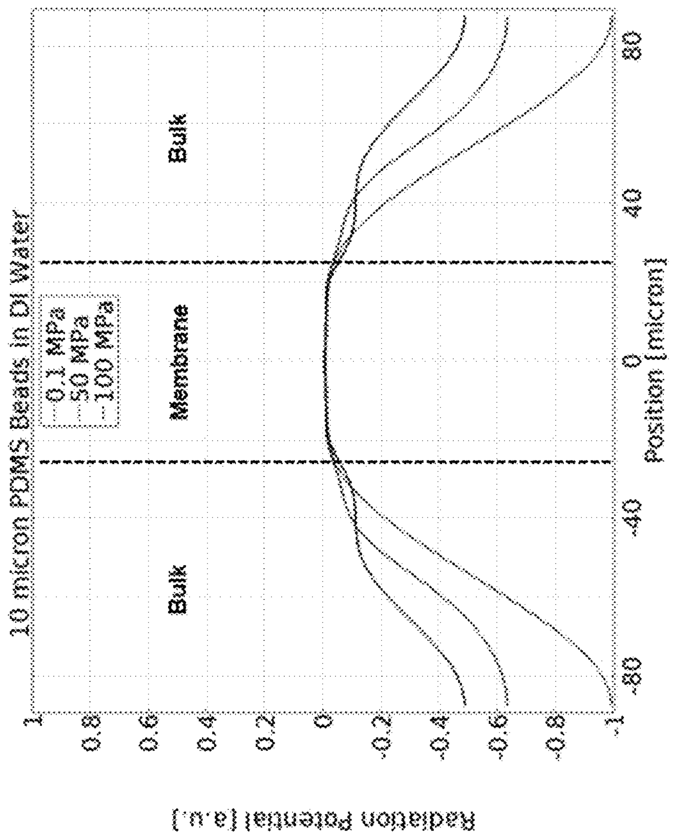

Contrarily, for air-filled microporous PDMS beads that exhibit much greater compressibility than water, the contribution of the velocity term in equation 1b becomes negligible. It has been shown that sound speed in PDMS can drop rapidly from 1000 m/s to 40 m/s when porosity varies from 0 to 30% (Kovalenko A et al., Soft matter, 13 (25), 4526-4532). Based on the relationship $\kappa_p=1/\rho c^2$, where c is the speed of sound, the high compressibility of porous PDMS can result in a $f_1$ factor orders of magnitude larger than $f_2$. FIG. 3D shows the simulated potential profiles at 5 μm above the PDMS structure for patterning of 10 μm microporous PDMS beads in water ($\rho_p$=965 kg m$^{-3}$, $\kappa_p$=9×10$^{-8}$ Pa$^{-1}$, $f_1$=−199, $f_2$=0.017). The compressibility of PDMS reverts the profiles of FIG. 3C and leads to trapping of the beads at high-pressure regions outside the air cavity.

As simulated, the compliant, viscoelastic PDMS membrane effectively limits the structure-induced vibration propagating from the bulk into the membrane region. This unique feature permits membranes of sizes larger than the propagation length to be utilized for arbitrary patterning on CMAP. In FIG. 5, the vibration from the bulk decays in ~10 μm from the edges of the PDMS membrane (E' at 0.1 MPa), regardless of the membrane width. In other words, the design process to create a desired potential landscape is greatly simplified via bypassing the complex analysis of fluid-structure interaction and acoustic modes encountered in the conventional acoustic devices.

Figure 6A:
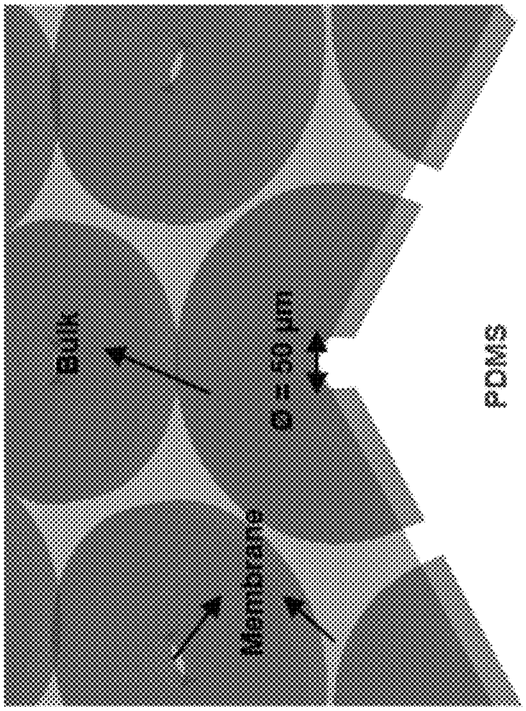
FIG. 6A through FIG. 6D depict the results of Laser Doppler Velocimetry (LDV) measurements of the vertical surface displacement of hard and soft, air-embedded PDMS structures cycling through different phases of a sinusoidal excitation at 3 MHz. The hard and soft PDMS of high and low E', respectively, exhibiting varying surface vibration patterns are demonstrated using a concentric rings-structure (FIG. 6A). The SEM cross-section of a fabricated sample (FIG. 6B) is shown. During the excitation, the surface profiles between the two PDMS structures (FIG. 6C, FIG. 6D) are noticeably different at the center membrane. Not only the hard PDMS structure generates higher order structure vibration mode but also creates larger area of membrane vibration relatively to the bulk. Scale bar, 50 μm.
Figure 6B:
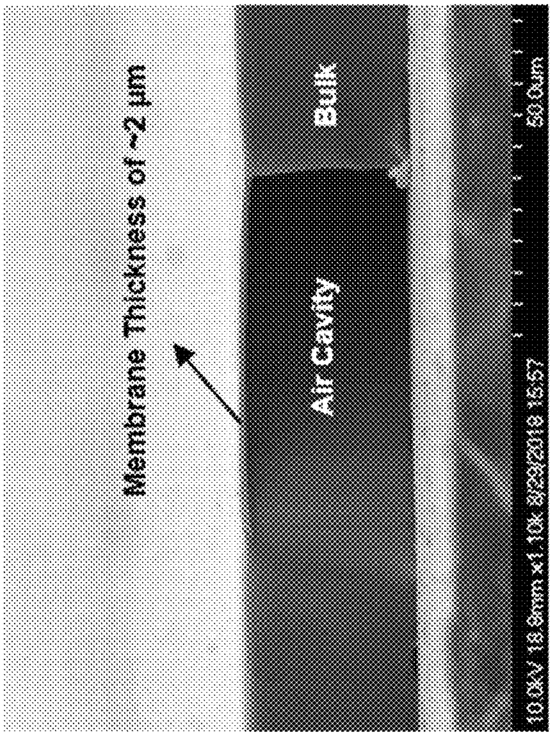
Figure 6D:
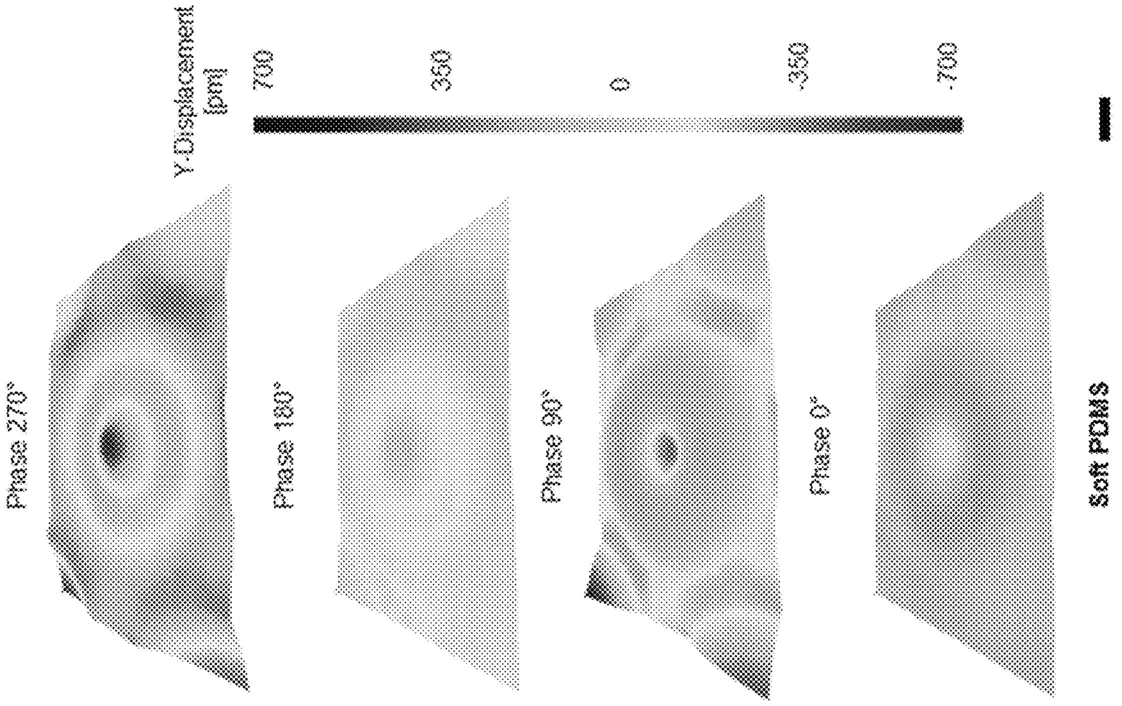
Figure 6C:
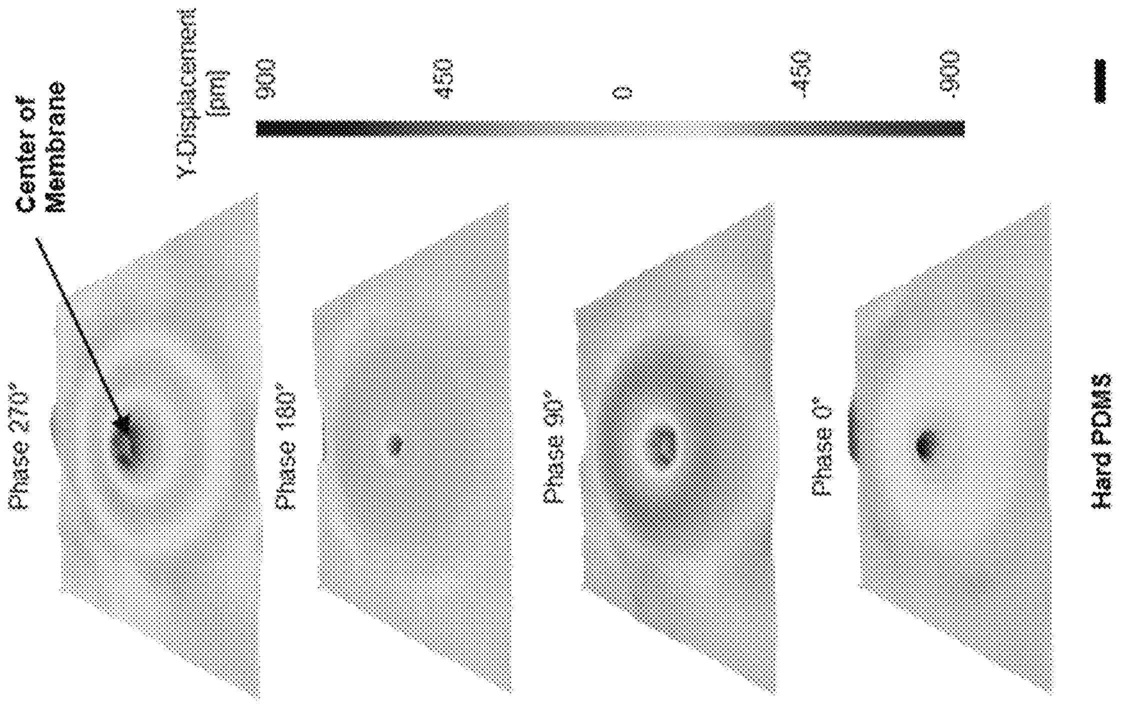

To evaluate the simulated results, the CMAP platform was fabricated using two types of PDMS of different Young's Moduli, E, to form the air-embedded, viscoelastic structures and then performed Laser Doppler Vibrometer (LDV) measurements over their surfaces. The first type was synthesized following the manufacturer's instructions using Sylgard 184 (Dow Corning Co.) to produce E of ~1750 kPa, and the second type was synthesized as a mixture of Sylgard 527 (Dow Corning Co.) and 184 at the weight ratio of 4:1 to produce E of ~250 kPa (Palchesko R N et al., PloS one, 7 (12), e51499). Although these are static moduli, decrease in E is accompanied by decrease in both the dynamic moduli, E' and E" (Hanoosh W S et al., Malaysian Polymer Journal, 4 (2), 52-61). Hence, the two compositions became the hard and soft, air-embedded PDMS structures representing the simulated cases of E' at 100 MPa and 0.1 MPa, respectively. A schematic diagram representing the PDMS structures (an array of concentric rings), FIG. 6A, is shown together with a SEM (Scanning Electron Microscopy) cross section, FIG. 6B, of a fabricated sample. Driven at similar operation conditions to those set in the simulations, the surface vertical displacements of the hard and soft PDMS structures, FIG. 6C and FIG. 6D, respectively, are measured over a cycle of acoustic excitation. For the hard PDMS structure, the surface profiles at phase 90 and 270 deg. show structural perturbation that propagates deeply into the center of membrane which excites high-order structure vibration mode, resembling the simulation results for E' at 50-100 MPa, FIG. 3C. For the soft PDMS structure at the same phases however, the displacement profiles at the center of membrane are smooth and resemble those of simulated E' at the range between 0.1-1 MPa, FIG. 3A. Of note here is that, in addition to the difference between the dynamic and static moduli, variation in PDMS thickness could modify its mechanical properties (Xu W et al., Langmuir, 27 (13), 8470-8477).

Arbitrary Patterning of Microparticles

Figures 7A, 7B, 7C, 7D:
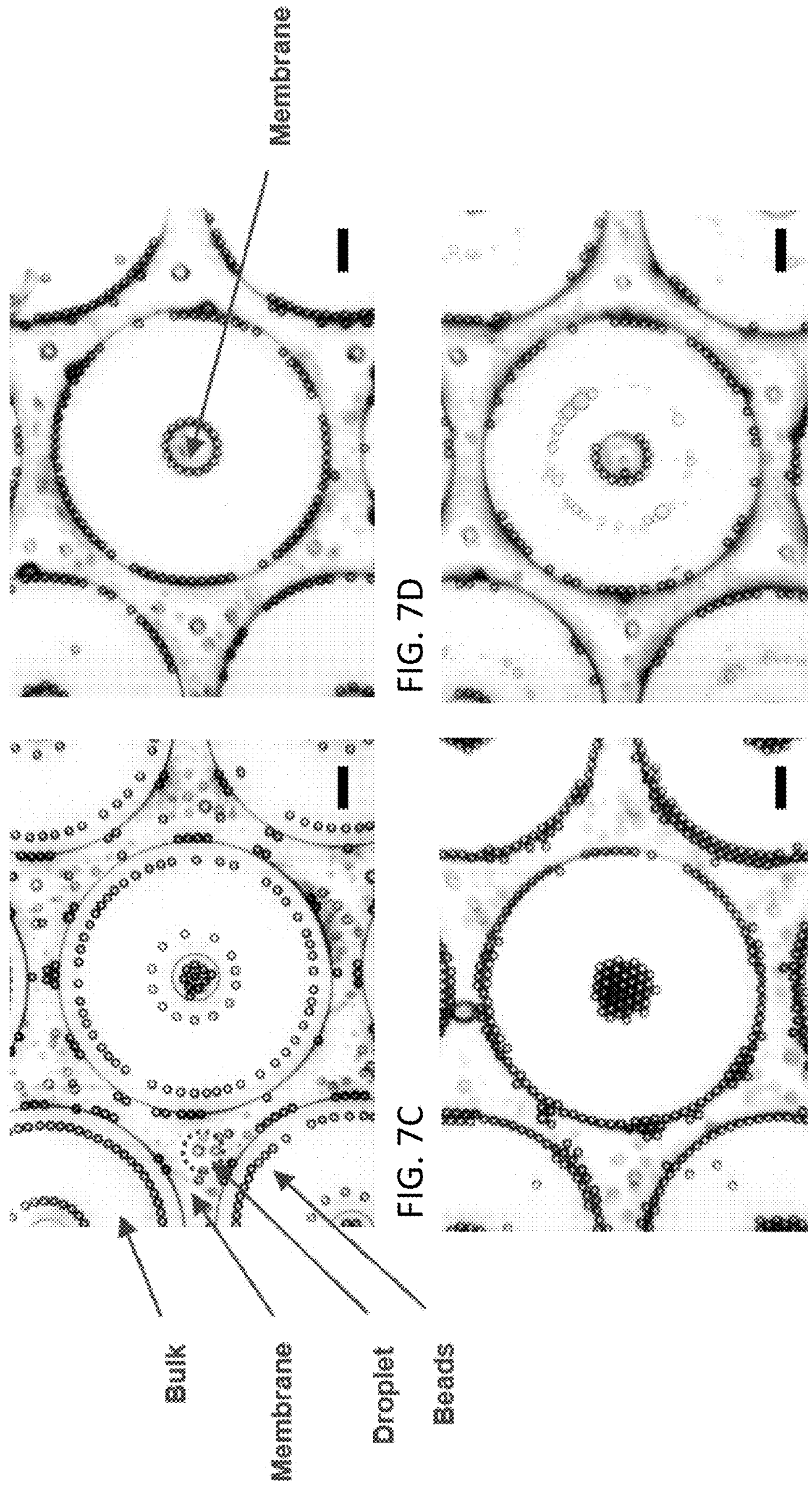
FIG. 7A through FIG. 7D depict the results of patterning microparticles in water using hard and soft, air-embedded PDMS structures in the shape of concentric rings. Hard and soft PDMS compositions are used to fabricate the concentric rings structures for comparison. Hard PDMS structure (FIG. 7A) leads to multiple patterns of 10 μm polystyrene beads across the bulk and membrane regions. Soft PDMS structure (FIG. 7B, FIG. 7C) enables clean patterning profiles precisely following the shape of air cavities. In low concentration (FIG. 7B), the beads are aligned with the edges of membranes where the lowest potential wells reside. In high concentration (FIG. 7C), the beads initially trapped at the edges were pushed into the membrane region where there are more beads than what the edges can hold. In a mixture (FIG. 7D), polystyrene and porous PDMS beads migrate to the locations of low and high pressure, respectively, corresponding to the potential landscapes simulated in FIG. 3C and FIG. 3D. Notice that water droplets are formed beneath the suspended membranes. Scale bar, 50 μm.

Arbitrary particle patterning has been a major complication in the field of acoustofluidics, where the patterning resolution and profile are restricted by attainable wavelength size and limited, periodic acoustic potential landscapes, respectively. Area of the patterning, too, is restrained due to weakening of wave propagation across device surface as in the case of SAWs. Alternatively, the new acoustic patterning mechanism using the CMAP platform described herein overcomes these challenges. As illustrated in FIG. 7A through FIG. 7D, 10 μm polystyrene beads in water are patterned using the prior hard and soft, air-embedded PDMS concentric rings-structures at the operating frequency of 3 MHz and voltage of 5 Vrms. While both structures demonstrate patternings that conform to the shape of membranes/air cavities, the hard PDMS structure in FIG. 7A exhibits additional trapping profile in the bulk region. This is exemplified by the simulation, FIG. 3C, that the PDMS structure of high E' at 100 MPa creates extra metastable potential wells in the bulk region, conforming to the experimental result, FIG. 7A, that shows additional wells generated ~20 μm away from the membrane edges. On the contrary, the soft PDMS structure in FIG. 7B through FIG. 7D shows trapping profile only at the membrane edges. For the simulated PDMS structure of low E' at 0.1 MPa, FIG. 3C, effective damping of wave propagation into the membrane provides membrane compliance to the above fluid motion where, and only where, the potential wells are generated. In low concentration of beads, FIG. 7B, trapping began at the membrane edges, where the lowest acoustic potentials reside as explained before. Such trapping was realized over a repeated concentric rings-pattern spanning over a 3×3 mm$^2$. Furthermore, as observed from the lining of the beads between the neighboring rings, a spatial resolution of 50 μm has been achieved, which is 10 times lower than the applied acoustic wavelength (~500 μm). This indicates the high resolution capability of CMAP as compared to other conventional acoustic approaches. At higher concentration, FIG. 7C, beads initially trapped on the edges of membrane are pushed toward the center, thus filling up the entire membrane space. Patterning of the mixture of polystyrene and microporous PDMS beads, FIG. 7D, is also demonstrated; result confirms to the simulations that the PDMS beads would accumulate at the high-pressure region in contrary to the polystyrene beads. Overall, using the soft PDMS rather than the hard PDMS as the air-embedded structure leads to clean profiles of arbitrary patternings.

Figure 8A:
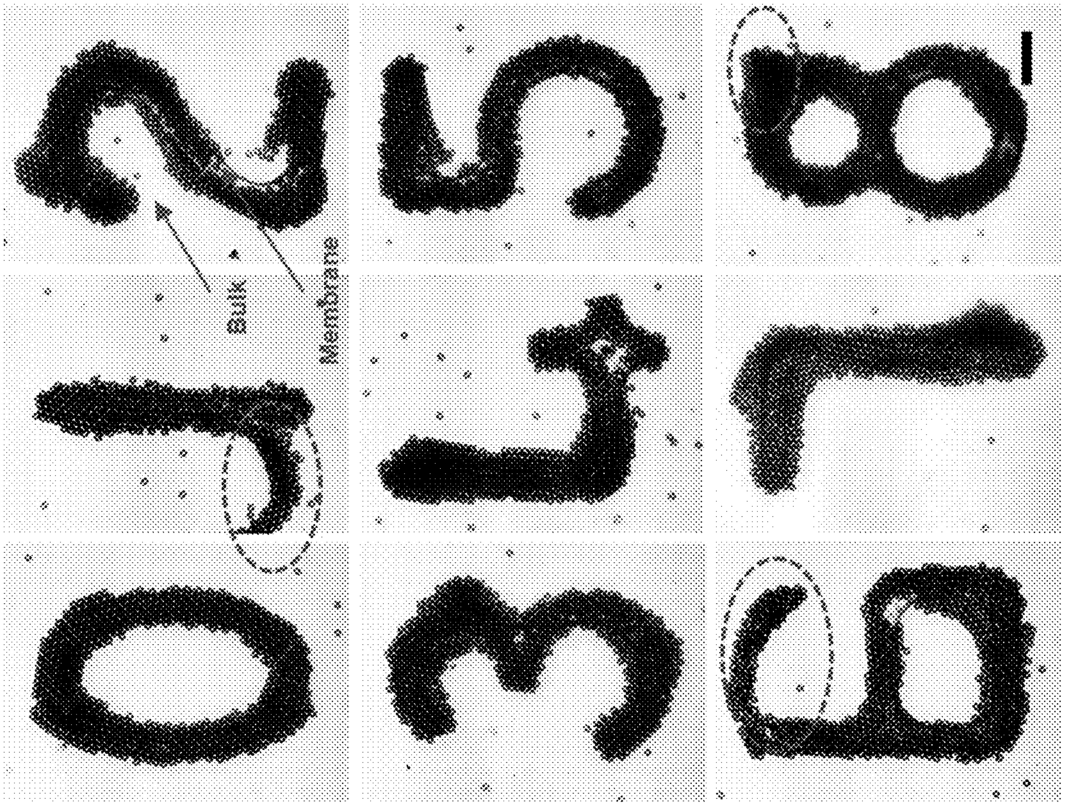
FIG. 8A through FIG. 8C depict the results of patterning microparticles in water using soft, air-embedded PDMS structures in the shape of numeric characters, and their corresponding acoustic pressure simulation. Soft PDMS enables precise and arbitrary patternings of 10 μm polystyrene beads (FIG. 8A). Although there are additional traces, circled in red, in both the patterning profiles and the simulated pressure landscape (FIG. 8B) that is directly above the PDMS structure, the trappings conform closely to the simulation. The simulation is performed using the 3-D model geometry (FIG. 8C), which consists of top fluid and bottom PDMS with embedded air cavities, similar as the aforementioned acoustic-structure interaction model in FIG. 3A through FIG. 3D. Scale bar, 70 μm.
Figure 8B:
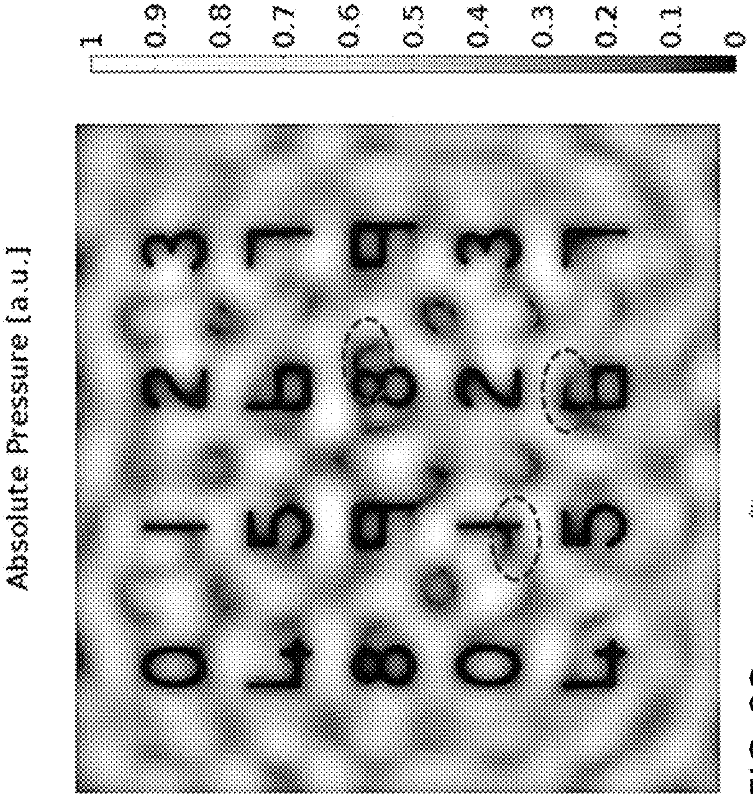
Figure 8C:
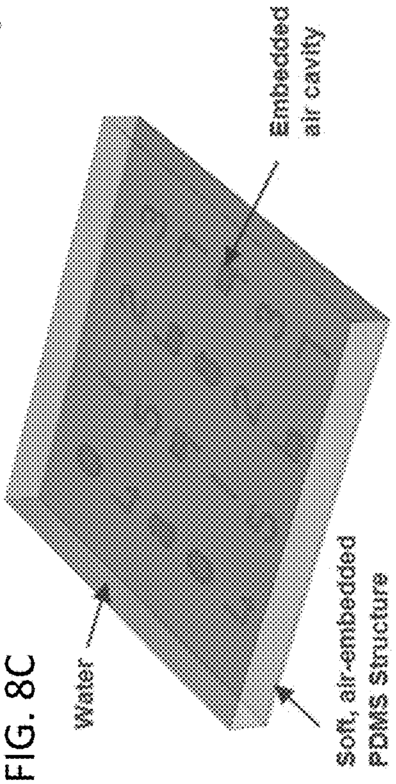

To further assess CMAP's ability in arbitrary pattering, another set of soft, air-embedded PDMS structures were fabricated consisting of numeric characters. At high concentration, FIG. 8A, 10 μm polystyrene beads in water completely filled up the membrane regions, however, with additional traces that are especially noticeable in the characters "1", "6", and "8". This is due to the wave interferences between the neighboring air cavities when the size of bulk region exceeds the acoustic wavelength. These traces, circled in red, are well captured by the acoustic pressure simulation, FIG. 8B, that considers only the pressure aspect among all the device phenomena incurred; the effect of fluid structure interaction was not accounted. The dark blue color represents the lowest value of absolute pressure mirroring the region of lowest acoustic potential. FIG. 8C shows the 3-D model geometry used in the simulation; the geometry is constructed with true dimensions in accordance to the fabricated soft PDMS structures. The close resemblance between the experimental and simulation results reflects the simplicity of using the CMAP mechanism to design a device that forms arbitrary acoustic potential profiles.

Arbitrary Patterning of Biological Cells

Similar to polystyrene beads, patterning of cells highly depends on the surface displacement of the soft, air-embedded PDMS structure, as well as the density and compressibility of the particles and their surroundings, that gives rise to the acoustic potential landscape. HeLa cells are chosen here to testify the biocompatibility of the CMAP platform.

Figure 9A:
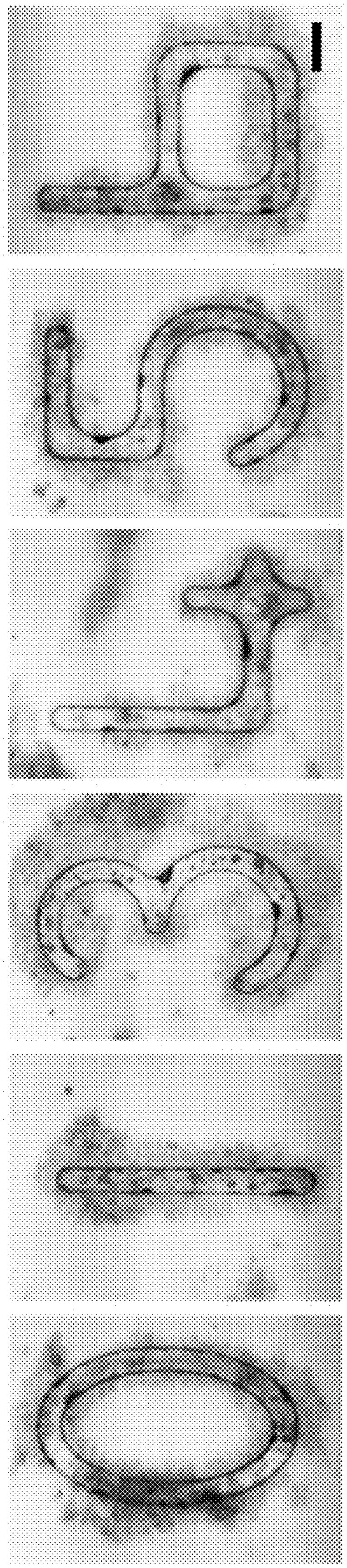
FIG. 9A through FIG. 9D depict the results of patterning and viability assessments of HeLa cells in DMEM using soft, air-embedded PDMS structures in the shape of numeric characters.

Since typical cells ($\rho_p$=1068 kg $m^{-3}$, $\kappa_p$=$3.77^{-10}$ $Pa^{-1}$ as in the case of breast cells) (Hartono D et al., Lab on a Chip, 11 (23), 4072-4080) in DMEM have like properties as polystyrene beads in water, their potential landscapes formed using the same soft PDMS structure should be nearly identical. As illustrated in FIG. 9A, patterning of HeLa cells in the shape of numeric characters resembles that of the polystyrene beads in FIG. 8A.

Figure 9B:
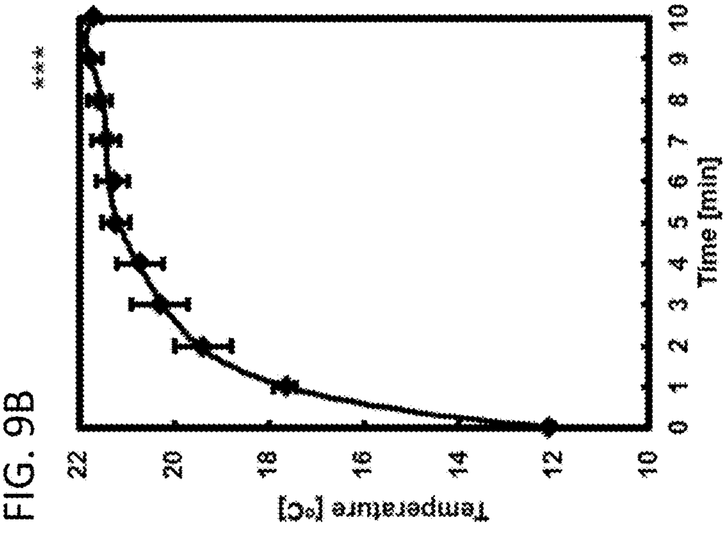
Figure 9C:
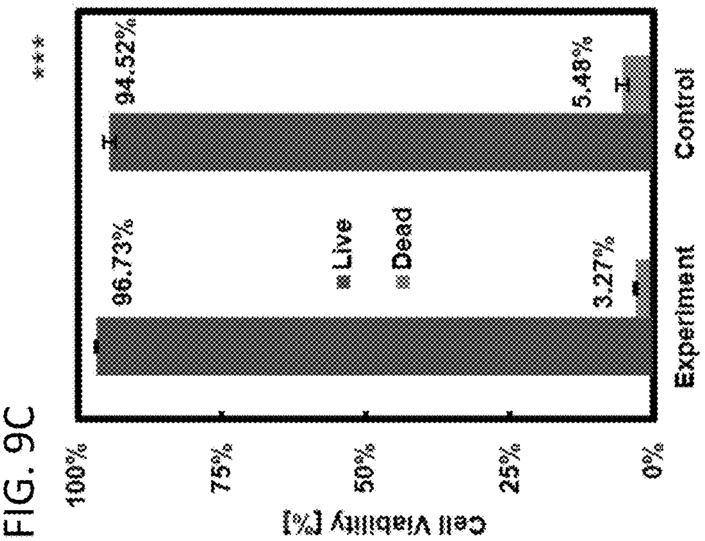
Figure 9D:
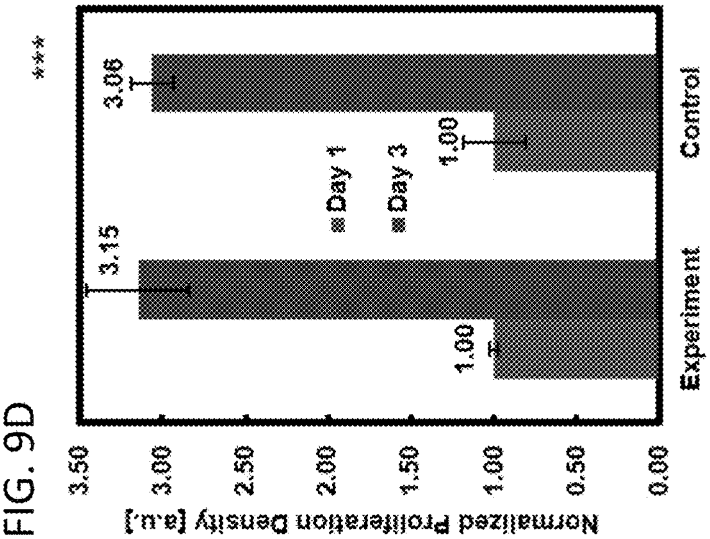

Numerous acoustic approaches for cell patterning have been assessed in determining the cell viability and proliferation, and prior approaches in the MHz-order acoustic fields have proven to be biocompatible (Ding X et al., Proceedings of the National Academy of Sciences, 109 (28), 11105-11109; Evander M et al., Analytical chemistry, 79 (7), 2984-2991; Bazou D et al., Toxicology in Vitro, 22 (5), 1321-1331; Leibacher I et al., Microfluidics and Nanofluidics, 19 (4), 923-933). The CMAP device platform, in the similar MHz-order of operation, provides comparable results. To prevent potential thermal damage due to heat accumulation on the CMAP device platform, the device was operated with a T.E. cooler set at 12° C. to control the chamber temperature. FIG. 9B illustrates the temperature as a function of time at the operating frequency of 3 MHz and voltage of 5 Vrms. The operation needs approximately 5 minutes before a steady state (~22° C.) is reached, a temperature less than the cell incubation at 37° C. Furthermore, viability assessment using Trypan blue (ATCC) and cell counts using hemocytometer (Hausser Scientific Reichert Bright-Line), following the manufacturers' protocols, are performed on the HeLa cells operated in the device under the same experimental condition for 5 minutes; outcome shows similar level of viability at 96.73% as compared to that of control at 94.52%, FIG. 9C. Assessment on the cell proliferation also shows promising results. After the experiment, portion of the cells were incubated for 48 hours (from Day 1 to Day 3). Using a hemocytometer, the densities of cells were approximated at Day 1 and at Day 3 for both the experiment and control which all indicate an increase by more than three folds, FIG. 7D. The increase corresponds to the HeLa cell doubling time that is approximately 24 hours (Boisvert F M et al., Molecular & Cellular Proteomics, 11 (3), M111-011429).

The CMAP platform is a powerful tool to realize deep sub-wavelength, arbitrarily shaped patternings of microparticles and biological objects. These are achieved using a suspended, thin and compliant PDMS membrane that minimizes the effect of structure-induced vibration and that adapts to the surrounding fluid motion without offsetting the intended acoustic potential landscape. The membrane can be of any geometry, making arbitrarily shaped patterning possible. Additionally, both the PZT and the soft, air-embedded PDMS structure can be scaled up for larger area patterning based on the underlying acoustic actuation principle.

Figure 4B:
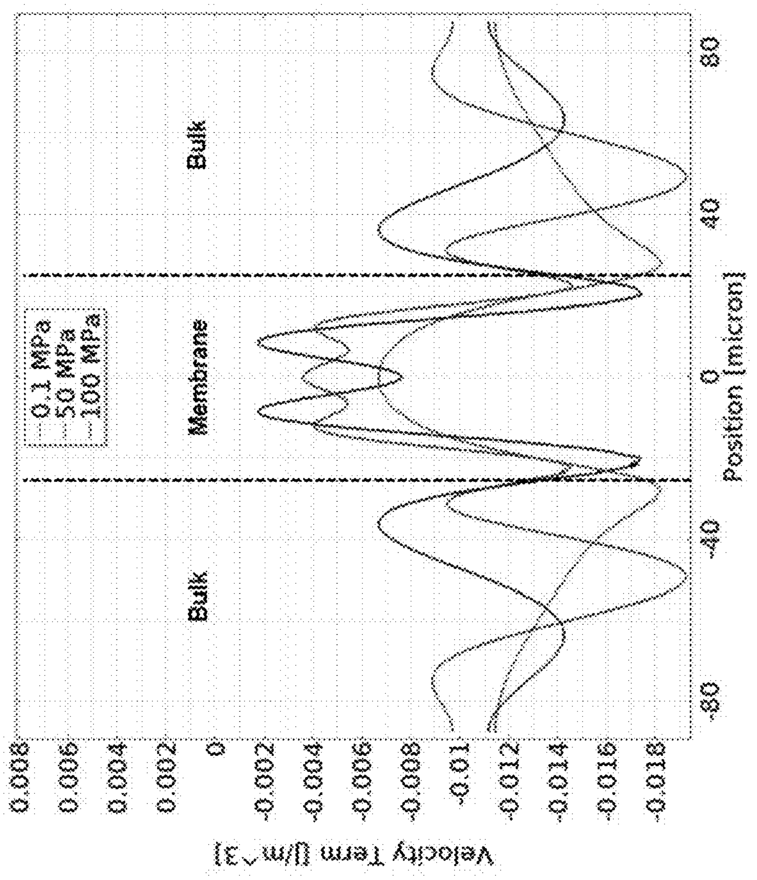
FIG. 4A and FIG. 4B depict the results of analyzing contributing factors to the resulted acoustic potential profile of FIG. 3C. The pressure term $$\frac{1}{2}\kappa_o < p^2 >$$
Figure 4A:
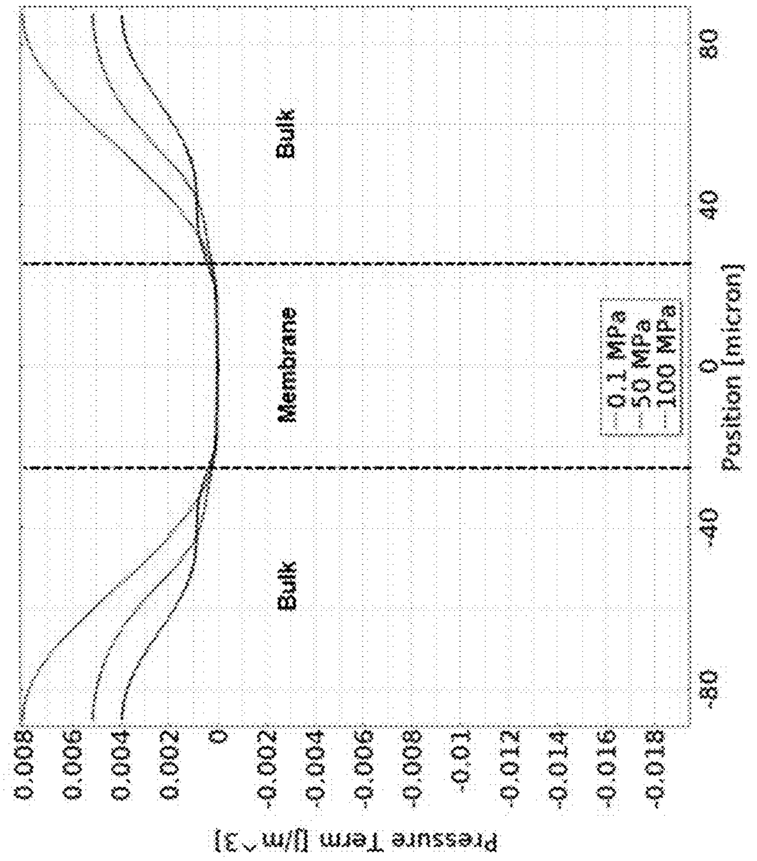
Figure 5A:
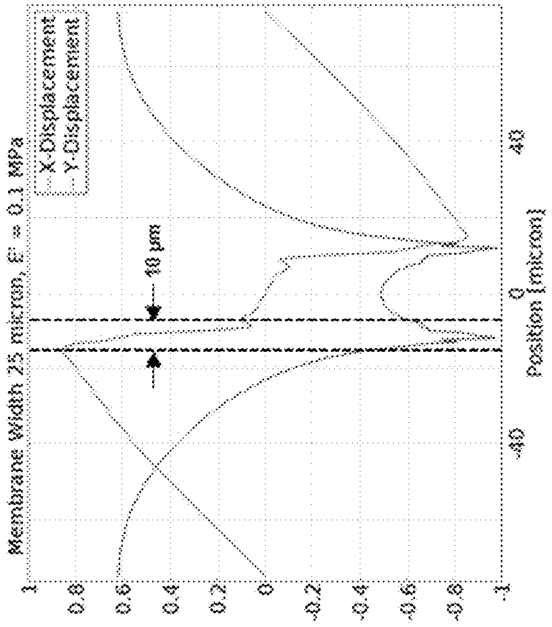
FIG. 5A through FIG. 5D depict the results of simulated surface displacements of soft, air-embedded PDMS structure with varying air cavity widths. To determine the length of wave decay from the bulk into the membrane region, different widths of air cavity were explored, sized from 25 μm to 500 μm (FIG. 5A-FIG. 5D), assuming the structure of E' of 0.1 MPa, following the simulation model in FIG. 3A through FIG. 3D. Results show that, regardless of the membrane sizes, wave propagating from the bulk decays in ~10 μm.
Figure 5B:
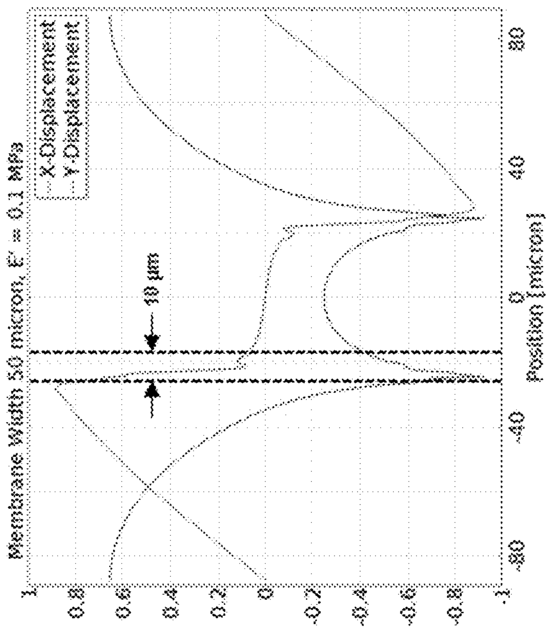
Figure 5C:
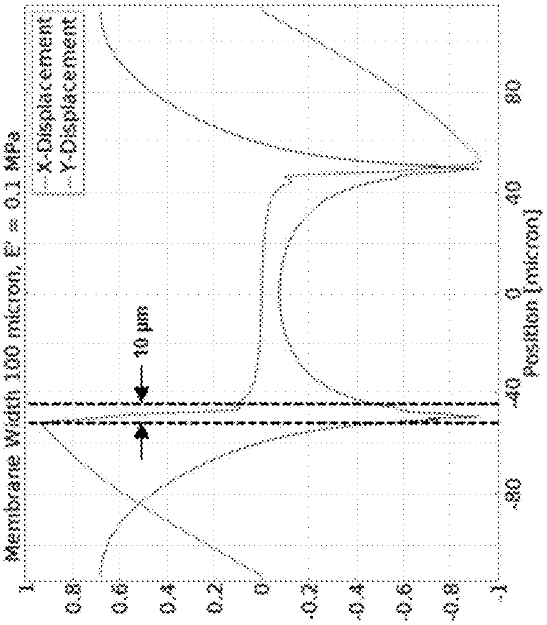
Figure 5D:
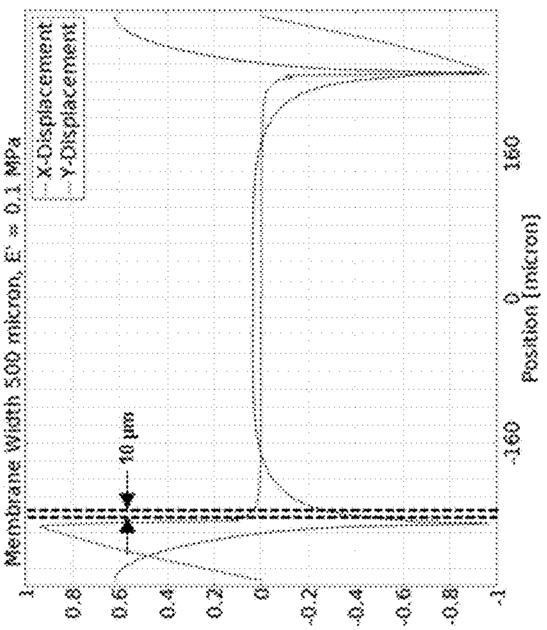

Of note here is that since the ARF in Eq. 2 includes both velocity and pressure terms that are usually coupled in practical applications, it is difficult to design a device optimized for acoustic patterning utilizing both terms. The CMAP platform is primarily designed for acoustic patterning based on the pressure term. Microparticles such as the polystyrene beads and most biological objects that have a similar density but different compressibility to water ($f_1$>>$f_2$) are ideal objects to be patterned on a CMAP device. For particles, such as metallic particles or air bubbles, with large density difference from water, the velocity term may dominate. Nevertheless, the patterns formed by these particles should also conform to the shape of air cavities since the cavity edges are where maximum velocity located as shown in FIG. 4B.

Although acoustic streaming force, ASF (Bruus H, Lab on a Chip, 12 (1), 20-28), can be induced to counterbalance the ARF and disturb the patterning, the experimental results suggest that ARF is the driving force when the operation frequency is above 3 MHz and the particle is sized 10 μm or larger. At the onset of the operation, streaming vortices are observed only at the center of the circular membrane and extend weakly to ~25 μm near the edge. On the other hand, the 10 μm polystyrene beads that were spread across the device migrate toward the membrane edges, where they are trapped firmly despite the later bulk movement of fluid as shown by the 1 μm beads. This strong trapping effect implies dominant strength of ARF to the patterning of 10 μm beads. The observed phenomenon of the bulk movement can be referred to as global flow, induced from the volumetric change of chamber as the upper PDMS lid expands thermally due to the heat generation from PZT. Since the upper PDMS lid (~1 cm) is substantially thicker than the bottom soft, air-embedded PDMS structure (~27 μm), the volumetric change should be predominately caused by the expansion of the lid. Although the 10 μm polystyrene beads and HeLa cells, respectively, outside the air cavities get drifted away, these are the excessive targets as to what the potential wells above the cavities can hold. Note that such drifts are mainly caused by the global flow because the ASF is only effective nearby the membrane edges. The drifts are favorable because they lead to overall cleaner patterning profiles without excessive targets outside the cavities. Blurring in images may be due to thermal expansion of PDMS causing structural deformation which affected microscope focusing. Besides the global flow, patternings of the 10 μm beads and HeLa cells reveal conformities to the pressure distribution simulated in FIG. 8B, further defying the significance of acoustic streaming.

3 MHz was chosen as the operation frequency because it is a high enough value to suppress the acoustic streaming flow and a low enough value to avoid extra acoustic heating. For example, when the operation frequency is lowered to 0.5 MHz, 10 μm polystyrene beads can follow the streamlines of 1 μm beads, circulating in vortex form near the membrane edges. This leads to unstable patterning and difficulty in achieving desired profile. On the other hand, while operation at higher frequency can minimize the streaming flow, it is accompanied by larger energy attenuation in PDMS and, thus, extra heat generation that needs to be managed (Tsou J K et al., Ultrasound in medicine & biology, 34 (6), 963-972).

While the CMAP platform relies on compliant, viscoelastic PDMS membrane to provide the breakthroughs in patterning, the membrane is so thin (~2 μm) that the above fluid can penetrate through. This is evident by the fluid droplets below the membrane regions as shown in FIG. 7A through FIG. 7D. Prior literatures have also demonstrated that PDMS is porous in nature which enables water molecules to diffuse through (Verneuil E et al., EPL (Europhysics Letters), 68 (3), 412; Randall G C et al., Proceedings of the National Academy of Sciences, 102 (31), 10813-10818). Accounting for the additional acoustic vibrations during the device operation, the fluid could have penetrated through the thin membrane which generated the droplets. Accumulation of the droplets could also affect particle patterning; if sufficient droplets are accumulated (e.g. filling up the air cavities), the membrane would no longer be fluid compliant and the patterning profile would be distorted. In order to avoid such problem, a thin film coating or surface treatment can be applied to prevent water penetration while maintaining the compliant characteristic of the membrane.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A compliant membrane acoustic patterning device for manipulating particles, comprising:
- a piezoelectric layer;
- a patterned layer comprising a plurality of cavities disposed on top of the piezoelectric layer, wherein each of the cavities are covered by a membrane that is flush with a top surface of the patterned layer;
- a fluid layer disposed on top of the patterned layer;
- a plurality of particles immersed in the fluid;
- a cover layer disposed on top of the fluid layer; and
- an oscillating power source configured to actuate the piezoelectric layer at an oscillation frequency.

2. The device of claim 1, wherein the piezoelectric layer comprises a material selected from the group consisting of: lead zirconate titate (PZT), barium titanate, and bismuth sodium titanate.

3. The device of claim 1, wherein the piezoelectric layer has a thickness between about out 100 μm and 1000 μm.

4. The device of claim 1, wherein the patterned layer comprises a polymer or gels.

5. The device of claim 1, wherein the patterned layer has a thickness between about 10 μm and 50 μm.

6. The device of claim 1, wherein the membrane has a thickness between about 1 μm and 5 μm.

7. The device of claim 1, wherein the membrane further comprises a coating selected from the group consisting of: a water impermeable coating or a functionalized coating.

8. The device of claim 1, wherein the fluid layer comprises a material selected from the group consisting of: cell culture media, blood, serum, and buffer solution.

9. The device of claim 1, wherein the particle is selected from the group consisting of beads, nanoparticles, microparticles, cells, bubbles, microorganisms, nucleic acids, and proteins.

10. The device of claim 1, wherein the cavities comprise a gas.

11. The device of claim 1, further comprising a controller electrically connected to the oscillating power source and configured to modulate the oscillation frequency.

12. The device of claim 1, further comprising a temperature regulator and a temperature sensor, wherein the temperature regulator is configured to maintain a temperature of the device.

13. A method of manipulating particles in a fluid, comprising the steps of:
- providing a compliant membrane acoustic patterning (CMAP) platform comprising a piezoelectric layer and a patterned layer disposed on top of the piezoelectric layer, wherein the patterned layer comprises at least one air cavity, each air cavity covered with a membrane that is flush with a top surface of the patterned layer;
- positioning a plurality of particles and a fluid on top of the patterned layer;
- positioning a cover layer on top of the fluid layer;
- passing an electrical signal to the piezoelectric layer that is converted into mechanical vibrations that generate acoustic waves at an oscillation frequency traveling upwards through the patterned layer, the fluid layer, and the cover layer; and
- forming near-field acoustic potential wells above each of the at least one air cavity by a difference in acoustic wave propagation through the patterned layer and the at least one air cavity, such that the plurality of particles accumulate on and conform to the membrane of each of the at least one air cavity.

14. The method of claim 13, wherein the patterned layer, air cavities, and membranes are formed by molding from a master mold, by injection molding, by stamping, by etching, or by 3D printing.

15. The method of claim 13, wherein the electrical signal is provided by an oscillating power source electrically connected to a controller.

16. The method of claim 13, wherein the oscillation frequency is between 1 MHz and 5 MHz.

17. The method of claim 15, wherein the oscillation frequency is about 3 MHz.

18. The method of claim 13, further comprising a step of maintaining a temperature of the platform.

19. The method of claim 13, wherein the fluid is selected from the group consisting of: cell culture media, blood, serum, and buffer solution.

20. The method of claim 13, wherein the plurality of particle is selected from the group consisting of beads, nanoparticles, microparticles, cells, bubbles, microorganisms, nucleic acids, and proteins.

* * * * *